United States Patent
Nagata

(10) Patent No.: US 8,314,852 B2
(45) Date of Patent: Nov. 20, 2012

(54) IMAGE CAPTURING APPARATUS, IMAGE CAPTURING METHOD, AND STORAGE MEDIUM

(75) Inventor: Toru Nagata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 275 days.

(21) Appl. No.: 12/782,917

(22) Filed: May 19, 2010

(65) Prior Publication Data

US 2010/0321525 A1 Dec. 23, 2010

(30) Foreign Application Priority Data

Jun. 17, 2009 (JP) ................................ 2009-144639

(51) Int. Cl.
 *H04N 5/235* (2006.01)
 *H04N 5/228* (2006.01)
 *H04N 5/262* (2006.01)
 *H04N 5/208* (2006.01)
 *H04N 3/14* (2006.01)
 *H04N 5/335* (2011.01)

(52) U.S. Cl. ............ 348/230.1; 348/222.1; 348/229.1; 348/239; 348/252; 348/296; 348/297; 348/302; 348/308

(58) Field of Classification Search ............ 348/221.1, 348/222.1, 229.1–230.1, 239, 252, 294–308, 348/362–368
See application file for complete search history.

(56) References Cited

U.S. PATENT DOCUMENTS

| | | | |
|---|---|---|---|
| 5,712,682 A * | 1/1998 | Hannah .................. | 348/255 |
| 7,023,369 B2 | 4/2006 | Bocko et al. ............ | 341/143 |
| 7,825,969 B2 * | 11/2010 | Tico et al. ............... | 348/273 |
| 2001/0040632 A1 * | 11/2001 | Yang et al. .............. | 348/294 |
| 2002/0012065 A1 * | 1/2002 | Watanabe ................ | 348/364 |
| 2002/0027606 A1 * | 3/2002 | Yadid-Pecht ........... | 348/298 |
| 2003/0020827 A1 * | 1/2003 | Bean et al. ............... | 348/363 |
| 2003/0052989 A1 * | 3/2003 | Bean et al. ............... | 348/362 |
| 2003/0184673 A1 * | 10/2003 | Skow ....................... | 348/364 |
| 2004/0263648 A1 * | 12/2004 | Mouli ...................... | 348/243 |
| 2006/0181625 A1 * | 8/2006 | Han et al. ................ | 348/297 |
| 2007/0103569 A1 | 5/2007 | Kawahito ................ | 348/241 |
| 2007/0115372 A1 * | 5/2007 | Wu et al. ................. | 348/230.1 |
| 2007/0171298 A1 * | 7/2007 | Kurane .................... | 348/362 |
| 2007/0216777 A1 * | 9/2007 | Quan et al. .............. | 348/222.1 |
| 2008/0049133 A1 * | 2/2008 | Bock ........................ | 348/317 |

(Continued)

FOREIGN PATENT DOCUMENTS

JP 2004-159274 A 6/2004

(Continued)

*Primary Examiner* — Jason Chan
*Assistant Examiner* — Michael Osinski
(74) *Attorney, Agent, or Firm* — Fitzpatrick, Cella, Harper & Scinto

(57) ABSTRACT

An image capturing apparatus including an image capturing unit configured to capture an image, and a generation unit configured to generate an exposure period map by assigning, to each of the plurality of image sensor pixels, exposure control information to control a charge accumulation time, based on preliminary captured image data obtained by preliminary image capturing using the image capturing unit. The exposure control information includes first exposure control information corresponding to a first accumulation time and second exposure control information corresponding to an accumulation time longer than the first exposure control information A correction unit expands a first region having the first exposure control information on the exposure period map, and a control unit controls the accumulation time for each of the plurality of image sensor pixels in accordance with the exposure period map corrected by the correction unit.

11 Claims, 19 Drawing Sheets

U.S. PATENT DOCUMENTS

| | | | |
|---|---|---|---|
| 2008/0055440 A1* | 3/2008 | Pertsel et al. | 348/297 |
| 2008/0166115 A1* | 7/2008 | Sachs et al. | 396/55 |
| 2008/0253758 A1* | 10/2008 | Yap et al. | 396/234 |

FOREIGN PATENT DOCUMENTS

| | | |
|---|---|---|
| JP | 2004-363666 A | 12/2004 |
| JP | 2006-253876 A | 9/2006 |
| JP | 2007-532025 A | 11/2007 |

\* cited by examiner

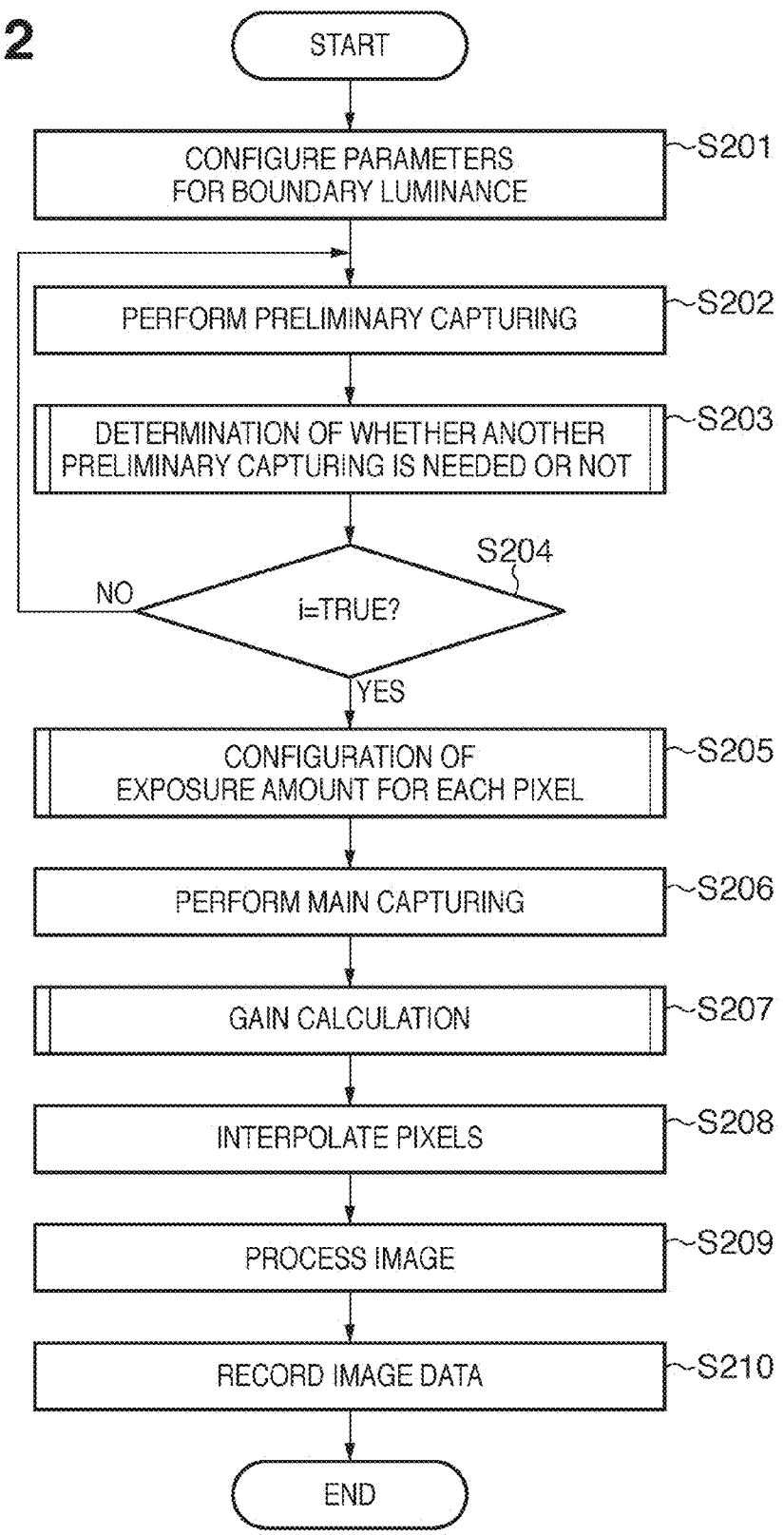

| NUMBER j | F-NUMBER Fj | SHUTTER SPEED Tj | ISO SENSITIVITY ISOj | PIXEL VALUE Pj |
|---|---|---|---|---|
| 0 | 8.0 | 1/1000 | 100 | 32 |
| 1 | 8.0 | 1/1000 | 100 | 34 |
| 2 | 8.0 | 1/1000 | 100 | 37 |
| 3 | 8.0 | 1/1000 | 100 | 40 |
| ⋮ | ⋮ | ⋮ | ⋮ | ⋮ |
| N | 8.0 | 1/1000 | 100 | 240 |
| N+1 | 8.0 | 1/2000 | 100 | 128 |
| N+2 | 8.0 | 1/1000 | 100 | 238 |
| ⋮ | ⋮ | ⋮ | ⋮ | ⋮ |

PRELIMINARY CAPTURING IMAGE → EXPOSURE PERIOD MAP

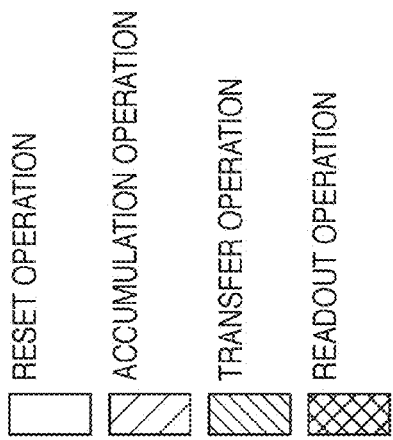
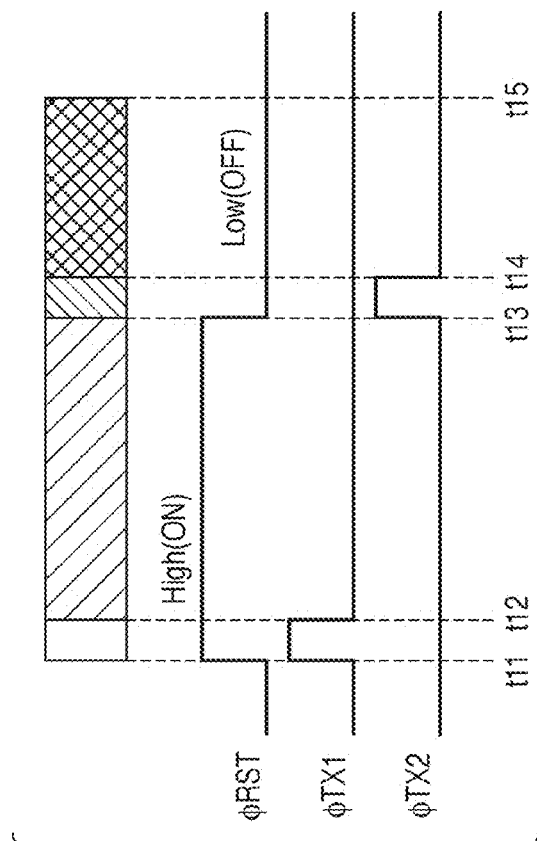
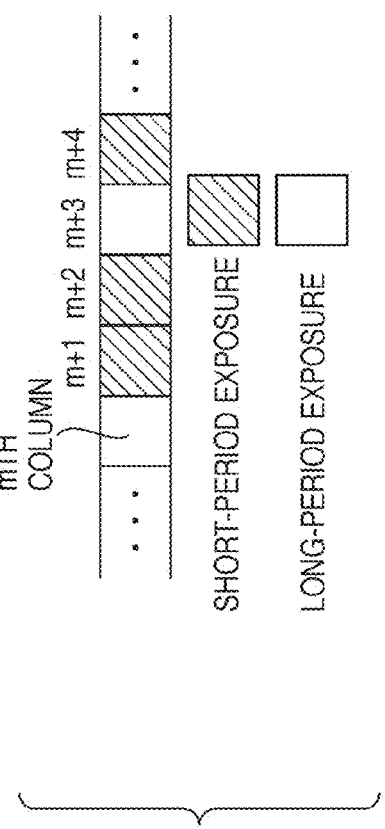
F I G. 14A
F I G. 14B

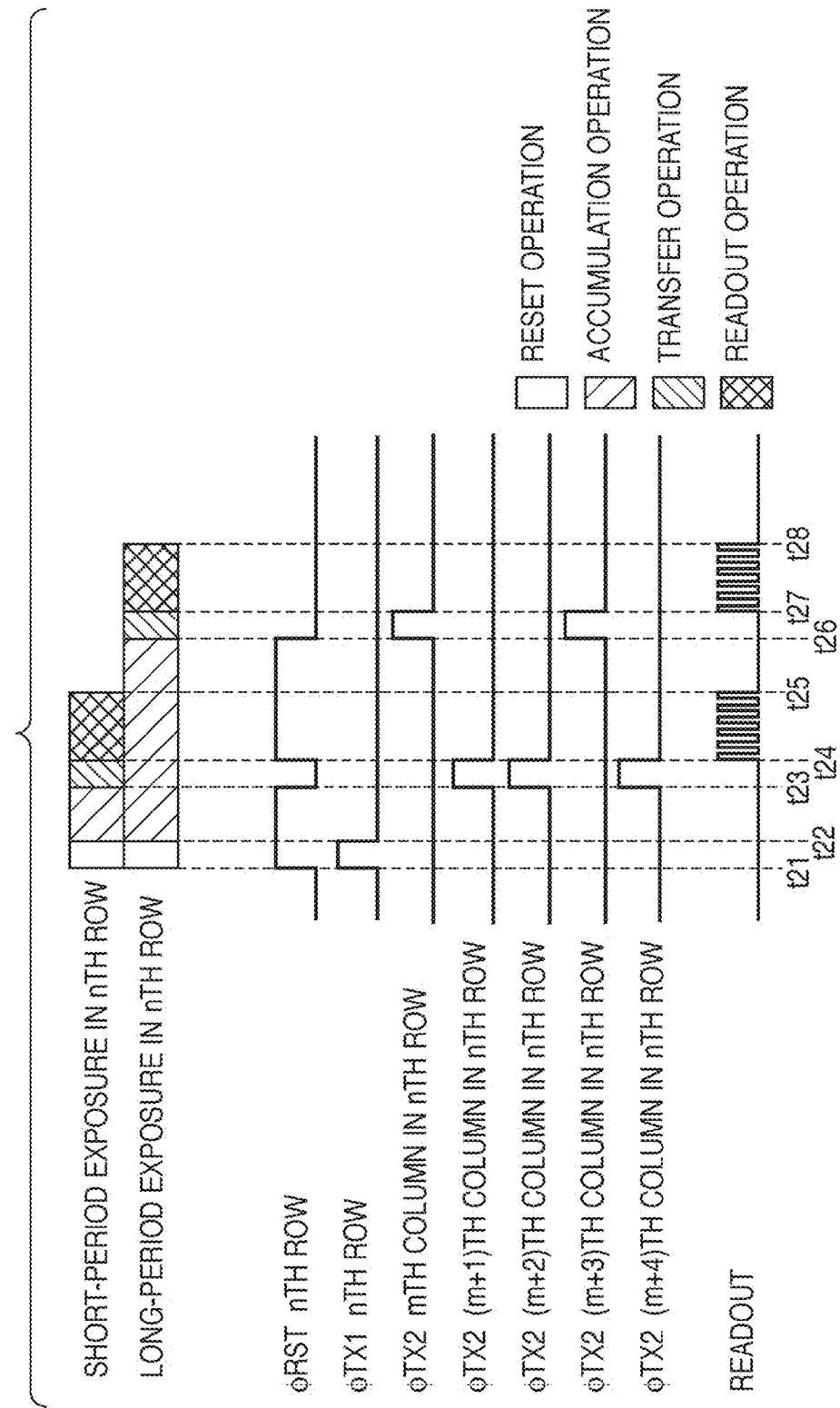

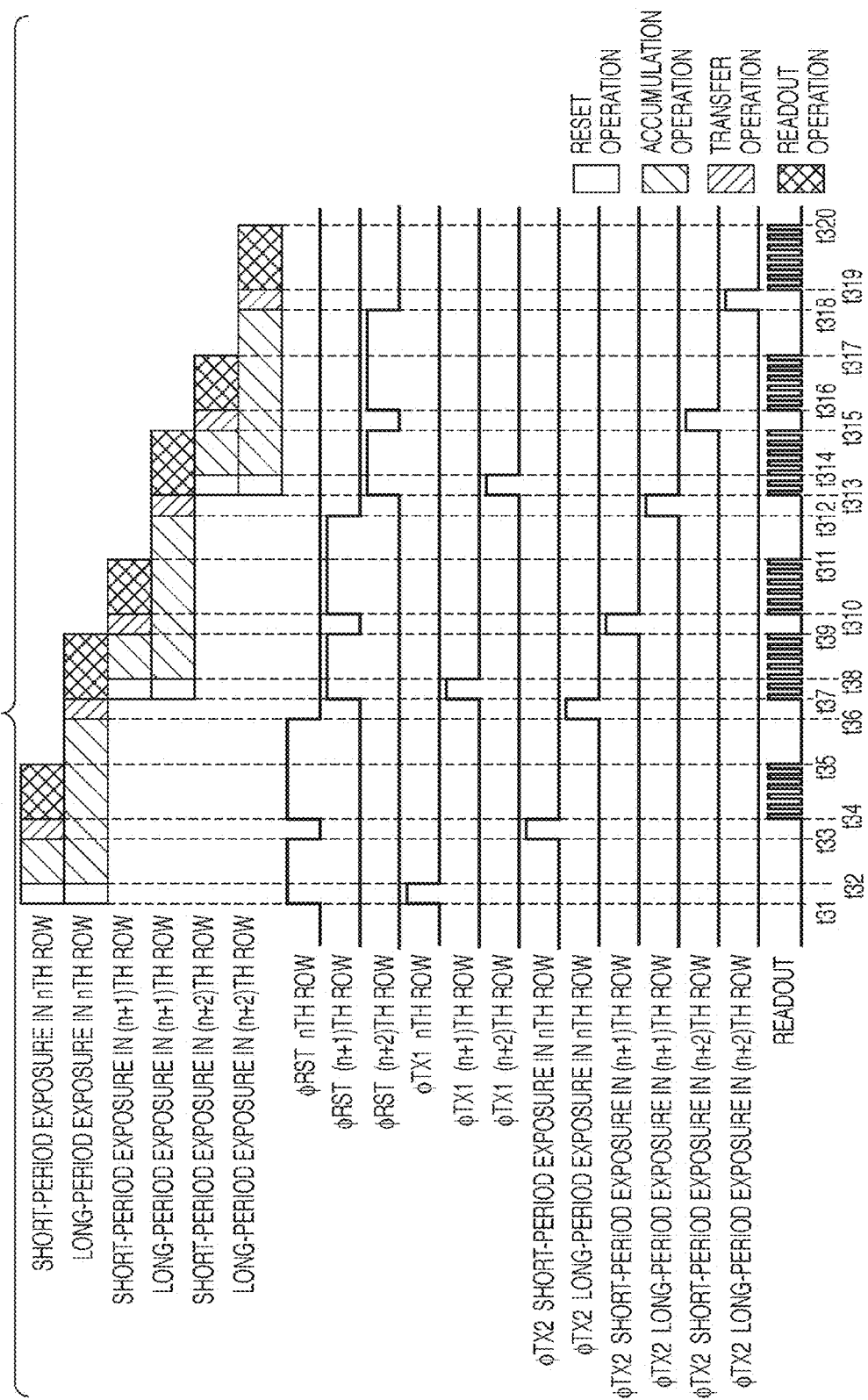

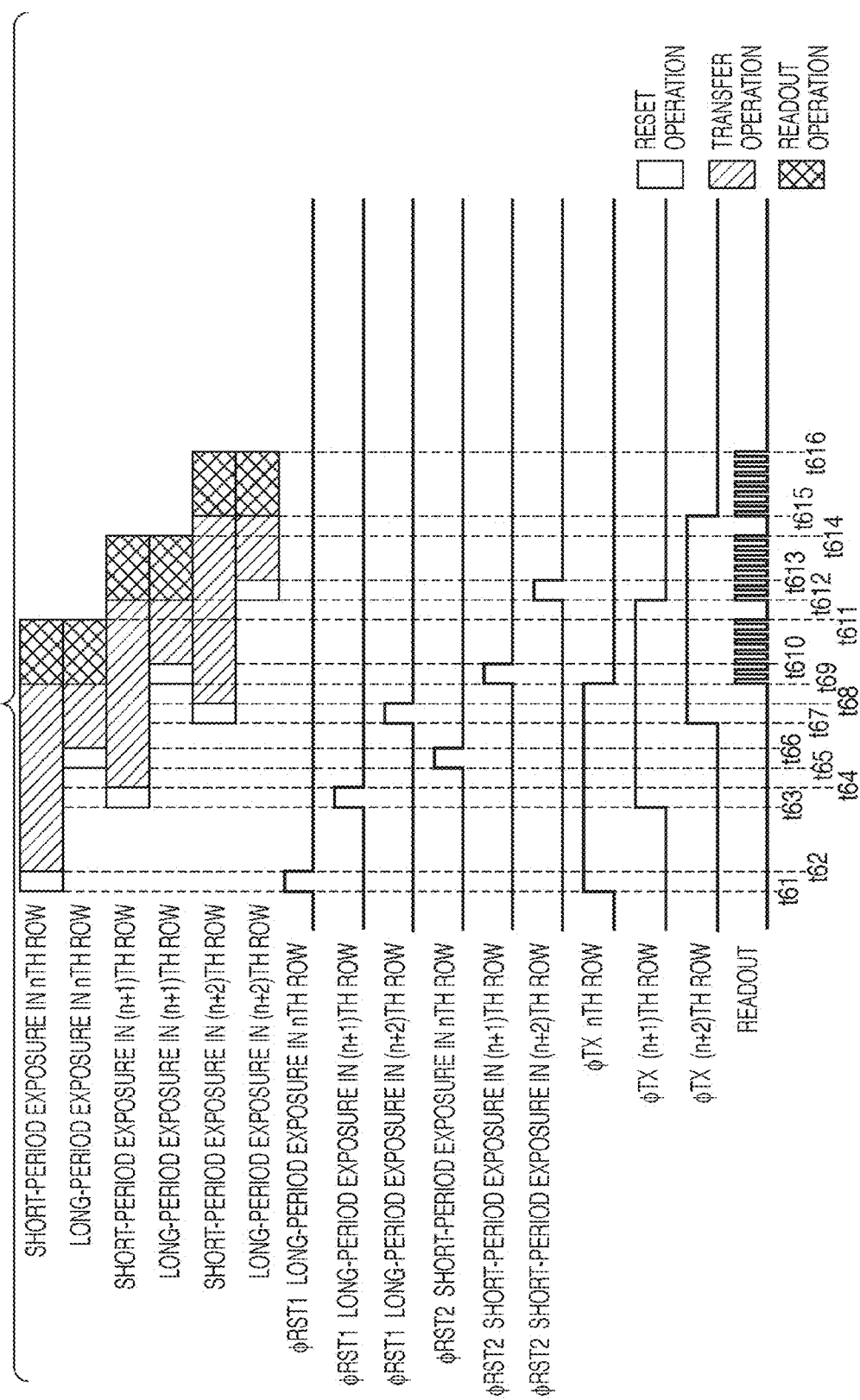

IMAGE CAPTURING APPARATUS, IMAGE CAPTURING METHOD, AND STORAGE MEDIUM

BACKGROUND OF THE INVENTION

1. Field of the Invention

The present invention relates to an image capturing apparatus that captures images with high dynamic-range, and a method of controlling the same.

2. Description of the Related Art

As is generally known, the dynamic range of an image sensor used in an image capturing apparatus such as a digital single-lens reflex camera, compact digital camera, or digital video camera is narrower than that of nature. For this reason, methods to widen the dynamic range of an image sensor have been conventionally examined. There are, for example, the following three methods.

Sampling a plurality of images by multi-shooting

One-shot sampling using an image sensor having pixels of different sensitivities arranged in a fixed pattern Controlling the exposure period of each pixel in accordance with the object luminance The three conventional methods that widen the dynamic range (to be referred to as DR hereinafter) will be explained below.

In the method of sampling a plurality of images by multi-shooting, a plurality of images of a single object are captured with various exposure periods. Based on the exposure period ratio, gain correction is performed for the pixel values of each image, thereby compositing the plurality of images. Information with a high DR (high dynamic range (HDR) image) is thus generated from the plurality of images. For example, according to a method described in Japanese Patent Laid-Open No. 2004-363666 (corresponding to U.S. Pre-Granted Publication No. 2007-103569), high-speed reading is performed in all pixels after long-time exposure. At this time, high-speed reading is performed in a time half of a frame cycle, and short-period exposure is performed in a time half of the remaining time. Additionally, during reading of the short-period exposure result, ¼ short-period exposure is performed. As a consequence, exposure is performed in a total of three different exposure periods, and the images are composited. In Japanese Patent Laid-Open No. 2004-159274 as well, a low illuminance signal by long-time accumulation, a high illuminance signal by short-time accumulation, and an ultra-high illuminance signal by very-short-time accumulation are obtained from the pixel unit of the image sensor. Exposure is thus performed in three different exposure periods, and the images are composited.

That is, sampling a plurality of images by multi-shooting allows to obtain a very wide dynamic range. However, due to misalignment caused by the time lag between shots, degradation such as contour blur or pseudo-contour occurs in the resultant composite image.

Second, the one-shot sampling method by fixed-pattern sensitivity arrangement is known. This is a method that eliminates the time lag between different exposure shots and, for example, misalignment of a moving object. In this method, a plurality of different sensitivity pixels are provided on the sensor so as to acquire a plurality of kinds of exposure information by image capturing of one time. To specifically set the sensitivities, the fill factor or filter transmittance of each pixel is changed to make the different sensitivities, and the pixels with the different sensitivities are arranged in a fixed pattern. This method can improve misalignment caused by the time lag between a high sensitivity signal and a low sensitivity signal. However, since the high and low sensitivities are fixed, if the luminance range of a scene is wider than the dynamic range of image capturing at the low sensitivity, highlight detail loss may occur. That is, the dynamic range widening effect cannot be obtained in some cases. As another method, the values of the high and low sensitivities are set depending on the length of the exposure period, as described in Japanese Patent Laid-Open No. 2006-253876. In this case, the sensitivities can be set in accordance with the scene.

However, in the one-shot sampling method, a sensitivity difference of a fixed pattern is set on the sensor. Hence, the number of sampling points is smaller than in a conventional RGB sensor for both the high and low sensitivities. This lowers the resolution. Additionally, the fixed pattern is used independently of the object luminance. For this reason, noise increases in pixels corresponding to the low sensitivity.

The third method controls the exposure period in accordance with the object luminance. For example, as described in Japanese Patent Laid-Open 2007-532025 (corresponding to U.S. Pat. No. 7,023,369), an A/D converter and a comparator which compares a converted digital value with an external digital value are arranged for each pixel. This enables to detect the appropriate exposure amounts of the pixels without a single charge reading.

In this method, however, the charge amounts need to be compared every time in all pixels. It is therefore difficult to increase the number of pixels and the number of bits. In addition, charges generated in a photodiode always flow as a floating diffusion. Since noise generated there cannot always be removed, resistance against noise is poor.

As described above, it is difficult to obtain a high-quality HDR image by image capturing of one time, even with the first to third conventional methods. More specifically, to obtain a high-quality HDR image, it is necessary to acquire pieces of image capturing information by exposure of a plurality of levels at once, and suppress noise and a decrease in resolution by changing the sensitivity in accordance with the object luminance.

Controlling the exposure amount for each pixel may enable to obtain a high-quality image by image capturing of one time. In this case, however, the image quality may degrade at a boundary portion where the exposure amount changes. For example, if the exposure amount control value contains such an error that increases the exposure amount, the pixel will be saturated. This will cause information loss, for example, highlight detail loss or degradation such as pseudo-contour.

SUMMARY OF THE INVENTION

The present invention has been made in consideration of the above-described problems, and provides an image capturing apparatus for capturing an image with high quality and high dynamic-range by image capturing of one time, and a method of controlling the same.

According to one aspect of the invention, an image capturing apparatus comprises: an image capturing unit configured to capture an image by driving a plurality of image sensor pixels; a generation unit configured to generate an exposure period map by assigning, to each of the plurality of image sensor pixels, exposure control information to control a charge accumulation time, based on preliminary capturing data obtained by preliminary capturing using the image capturing unit, the exposure control information including first exposure control information corresponding to a first accumulation time and second exposure control information corresponding to an accumulation time longer than the first exposure control information; a correction unit configured to expand a first region having the first exposure control information on the exposure period map; and a control unit configured to control the accumulation time for each of the plurality of image sensor pixels in accordance with the exposure period map corrected by the correction unit, wherein the image capturing unit performs main capturing in accordance with the accumulation time controlled by the control unit.

According to the present invention with the above arrangement, it is possible to capture an image with high quality and high dynamic-range by image capturing of one time.

Further features of the present invention will become apparent from the following description of exemplary embodiments (with reference to the attached drawings).

BRIEF DESCRIPTION OF THE DRAWINGS

FIG. 2 is a flowchart illustrating high dynamic-range image capturing processing according to the first embodiment;

FIGS. 14A to 14D are views showing an example of driving pixels according to the first embodiment;

FIG. 18 is a timing chart of pixel driving clocks according to the third embodiment.

DESCRIPTION OF THE EMBODIMENTS

Exemplary embodiments of the present invention will now be described in detail in accordance with the accompanying drawings. Note that each element in the following embodiments is not intended to limit the scope of the invention, but is merely an example.

First Embodiment

Arrangement of Image Capturing Apparatus

Figure 1:
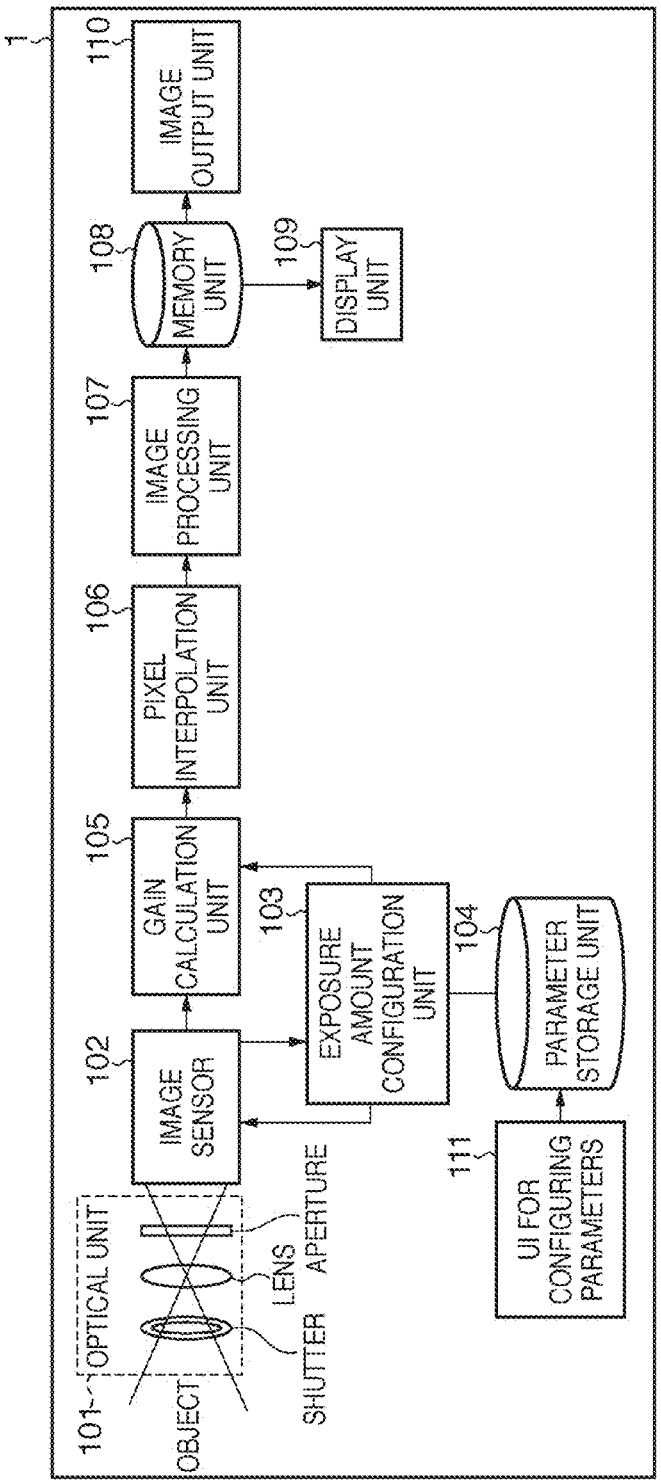
FIG. 1 is a block diagram showing an example of the arrangement of an image capturing apparatus according to the first embodiment.

FIG. 1 is a block diagram showing an example of the arrangement of an image capturing apparatus according to this embodiment. In an image capturing apparatus 1, an optical unit 101 includes a shutter, lens, aperture, and optical LPF. An image sensor 102 includes color filter array (CFA) of a plurality of colors which are arrayed horizontally and vertically in a mosaic pattern, and a CMOS sensor. The image sensor 102 performs preliminary capturing and main capturing of an object. An exposure amount configuration unit 103 configures the charge accumulation time of each pixel based on a result of preliminary capturing by the image sensor 102. The charge accumulation time will also be referred to as an exposure amount or an exposure period hereinafter. A parameter storage unit 104 stores parameters associated with the boundary luminance between a plurality of exposure amounts. A gain calculation unit 105 performs gain correction for each pixel using an image obtained upon main capturing by the image sensor 102 and an exposure amount configured by the exposure amount configuration unit 103. A pixel interpolation unit 106 performs interpolation processing for a mosaic-like CFA image after the gain correction by the gain calculation unit 105, thereby obtaining a plurality of independent plane images.

An image processing unit 107 executes color processing, noise reduction, sharpening process, and the like. A memory unit 108 records an image processed by the image processing unit 107. A display unit 109 such as a liquid crystal display displays an image during or after image capturing or after image processing. An image output unit 110 outputs an image. A UI 111 for configuring parameters is used by the user to configure parameters for the boundary luminance. Note that the image sensor 102 performs preliminary capturing using the parameters for the boundary luminance stored in the parameter storage unit 104. A printer, a display, and a recording medium such as a memory card can be connected to the image output unit 110 via a cable and the like.

The image capturing apparatus 1 having the above-described arrangement controls the exposure amount for each pixel in accordance with the object luminance, as will be described later in detail. The image capturing apparatus 1 thus captures a high-quality HDR image. At this time, if the exposure amount control value contains such an error that increases the exposure amount at the boundary portion of exposure amount control, the pixel will be saturated. This causes information loss, for example, highlight detail loss or degradation such as pseudo-contour. To prevent this, contour correction is done for an image obtained by preliminary capturing in this embodiment. This eliminates an inappropriate error at the boundary portion of exposure amount control, and suppresses image quality degradation.

An HDR image capturing operation according to this embodiment will be described below with reference to the flowchart of FIG. 2.

The high dynamic-range image capturing operation of this embodiment is roughly divided into the following eight processes: parameter configuration processing for the parameter storage unit 104 based on a user input via the UI 111 for configuring parameters (corresponding to step S201 to be described later), preliminary capturing processing (corresponding to step S202) and main capturing processing (corresponding to step S206) by the image sensor 102, processing of determining whether another preliminary capturing is needed or not (corresponding to step S203) and processing of configuring an exposure amount for each pixel for an image obtained by preliminary capturing (corresponding to step S205) by the exposure amount configuration unit 103, gain correction for an image obtained by main capturing by the gain calculation unit 105 (corresponding to step S207), pixel interpolation processing for a mosaic-like captured mage by the pixel interpolation unit 106 (corresponding to step S208), and image processing such as color processing, noise reduction, sharpening process by the image processing unit 107 (corresponding to step S209).

Referring to FIG. 2, in step S201, the image capturing apparatus 1 sets FALSE in a variable i representing the end of preliminary capturing. The image capturing apparatus 1 also performs initialization to, for example, allocate a memory. The image capturing apparatus 1 also displays the UI 111 for configuring parameters to be described later. The image capturing apparatus 1 configures, in the parameter storage unit 104, parameters according to a user input via the UI for configuring parameters.

In step S202, the image sensor 102 sets a uniform exposure amount for all pixels of the CMOS sensor, and performs preliminary capturing.

In step S203, the exposure amount configuration unit 103 determines whether another preliminary capturing is needed or not. More specifically, in step S203, if preliminary capturing data satisfies a criterion to be described later, the exposure amount configuration unit 103 sets the variable i representing the end of preliminary capturing to TRUE. In step S204, the exposure amount configuration unit 103 determines whether TRUE is set in the variable i. If TRUE is set, the preliminary capturing ends, and the process advances to step S205. If the variable i remains FALSE, the process returns to step S202, and the exposure amount configuration unit 103 performs another preliminary capturing. Note that the processing of determining whether another preliminary capturing is needed or not in step S203 will be described later in detail.

In step S205, the exposure amount configuration unit 103 configures the exposure amount of each pixel for main capturing based on the preliminary capturing data obtained in step S202. Note that the processing of configuring an exposure amount for each pixel will be described later in detail.

In step S206, the image sensor 102 performs main capturing based on the configuration of the exposure amount for each pixel in step S205. In step S207, the gain calculation unit 105 performs gain correction for the main capturing data acquired in step S206 based on the configuration of the exposure amount for each pixel in step S205. The gain correction will be described later in detail.

In step S208, the pixel interpolation unit 106 performs pixel interpolation processing for the mosaic-like captured image after the gain correction. In step S209, the image processing unit 107 executes image processing such as color processing, noise reduction, and sharpening process for the image after the pixel interpolation processing. In step S210, the memory unit 108 records the image data processed in step S209. Then, the image capturing apparatus performs a terminating operation.

Note that the initial conditions of preliminary capturing according to this embodiment can be set to perform image capturing at a shutter speed much shorter than in main capturing.

Parameter Configuration (S201)

The UI 111 for configuring parameters displayed in step S201 will be described below with reference to FIGS. 3A and 3B. Note that the UI 111 for configuring parameters changes its display between FIGS. 3A and 3B in accordance with the selected button. The same reference numerals denote the same buttons in FIGS. 3A and 3B.

Buttons and the like common to FIGS. 3A and 3B will be explained first. Reference numeral 302 denotes a button for configuring parameters. When the user presses the button 302, parameters for the boundary luminance configured on the UI are recorded. Reference numeral 303 denotes an end button. When the user presses the button 303, the memory is released if the parameters for the boundary luminance have been configured on the UI once. Then, the dialog window of the UI 111 for configuring parameters is closed. On the other hand, if the parameters for the boundary luminance have not been configured, the average luminance in a photometric window given in advance is recorded as a parameter for the boundary luminance. Then, the memory is released, and the dialog window of the UI for configuring parameters is closed.

Reference numeral 304 denotes a radio button for designating a region. When the user selects the button 304, a region designation window as shown in FIG. 3A is displayed. The region designation window in FIG. 3A displays an image display region 306, sliding bars 308 and 309, and text boxes 310 and 311 to be described later.

Reference numerals 305 denotes a radio button for designating a relative luminance. When the user selects the button 305, a relative luminance designation window as shown in FIG. 3B is displayed. The relative luminance designation window in FIG. 3B displays a window 312, sliding bar 313, and text box 314 to be described later.

Figure 3A:
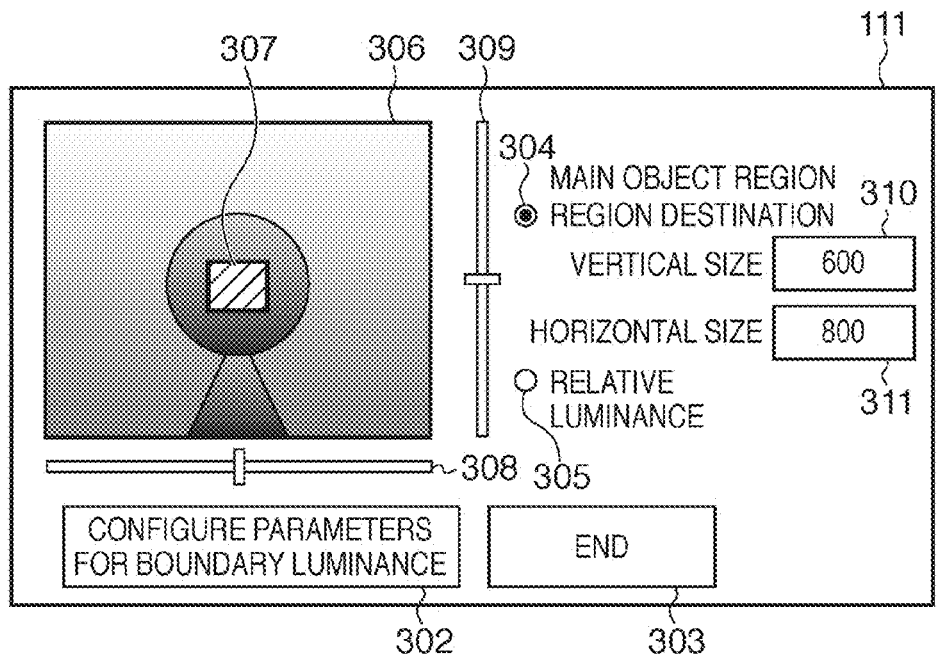
FIGS. 3A and 3B are views showing an example of a UI for configuring parameters according to the first embodiment.

In the region designation window shown in FIG. 3A, a viewfinder image is displayed in the viewfinder image display region 306. Reference numeral 307 denotes a main object region. The position of the main object region 307 can be set on the viewfinder image display region 306, with the sliding bars 308 and 309 for setting the main object region. The text boxes 310 and 311 are used to designate the size of the main object region 307. When the user inputs numerical values in the text boxes 310 and 311, the size of the main object region 307 changes.

When the user presses the button 302 for configuring parameters on the region designation window shown in FIG. 3A, the position and size of the main object region 307 set on the viewfinder image display region 306 are recorded as parameters for the boundary luminance.

Figure 3B:
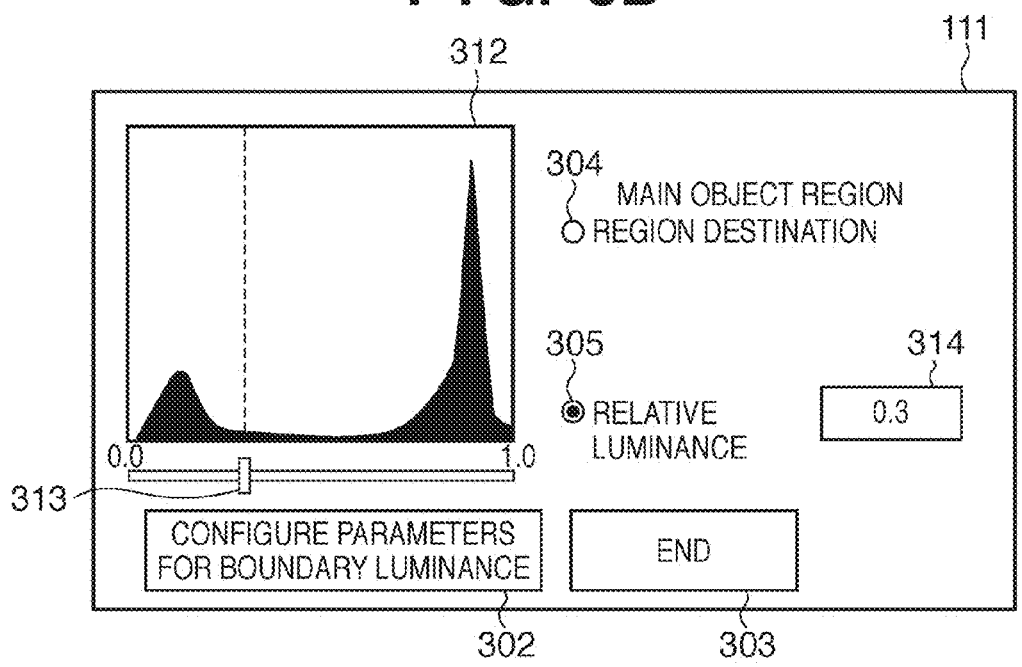

In the relative luminance designation window shown in FIG. 3B, the histogram display window 312 displays the luminance histogram of the viewfinder image. Reference numeral 313 denotes the sliding bar for inputting the main object luminance. A relative luminance input by the user using the sliding bar 313 is displayed in the text box 314. A numerical value the user has input to the text box 314 is reflected on the position of the sliding bar 313.

When the user presses the button 302 for configuring parameters on the relative luminance designation window shown in FIG. 3B, the relative luminance represented by the sliding bar 313 is recorded as a parameter for the boundary luminance.

Figure 4:
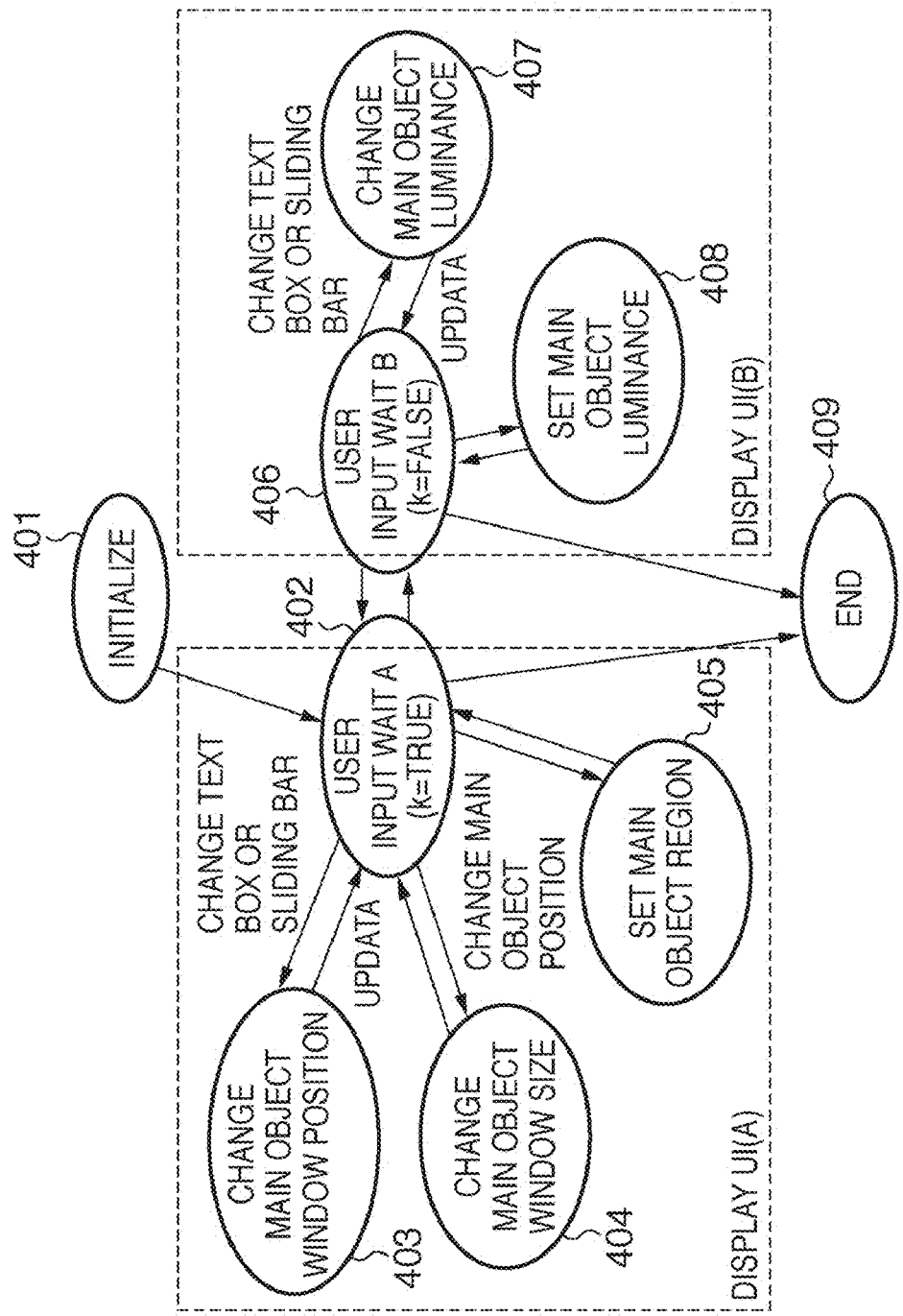
FIG. 4 is a view showing state transition of the UI for configuring parameters according to the first embodiment.

The parameter configuration operation on the UI 111 for configuring parameters will be described with reference to the state transition chart of FIG. 4. In a state 401, initialization is performed to, for example, read out initial set values and display the UI in FIG. 3A. Then, the state transits to a state 402.

In the state 402, the apparatus waits for a user operation while keeping the UI in FIG. 3A displayed. Here, a variable k representing the method of designating the parameters for the boundary luminance is set to TRUE. When the user moves the sliding bars 308 and 309, the state transits to a state 403. In the state 403, the display position of the main object region 307 is changed, and display in the main object region 307 is updated. Then, the state returns to the state 402.

In the state 402, when the user inputs numerical values in the text boxes 310 and 311, the state transits to a state 404. In the state 404, the window size is changed, and display in the main object region 307 is updated. Then, the state returns to the state 402.

In the state 402, when the user presses the button 302 for configuring parameters, the position and size of the main object region 307 and the variable k representing the method of designating the parameters for the boundary luminance are stored in the parameter storage unit 104. When the user presses the end button 303, the state transits to a state 409, and the terminating operation is performed.

In the state 402, when the user selects the radio button 305 for designating a relative luminance, the state transits to a state 406. In the state 406, the apparatus waits for a user operation while keeping the UI in FIG. 3B displayed. Here, the variable k representing the method of designating the parameters for the boundary luminance is set to FALSE.

In the state 406, when the user input directions with the sliding bar 313 or the text box 314, the state transits to a state 407. In the state 407, the main object luminance is changed based on the position of the sliding bar 313 or the information input to the text box 314, and the state returns to the state 406.

In the state 406, when the user presses the button 302 that is used to configure parameters, the main object luminance and the variable k representing the method of designating the parameters for the boundary luminance are stored in the parameter storage unit 104. When the user presses the end button 303, the state transits to the state 409, and the terminating operation is performed.

Exposure Amount Configuration Unit 103

Figure 5:
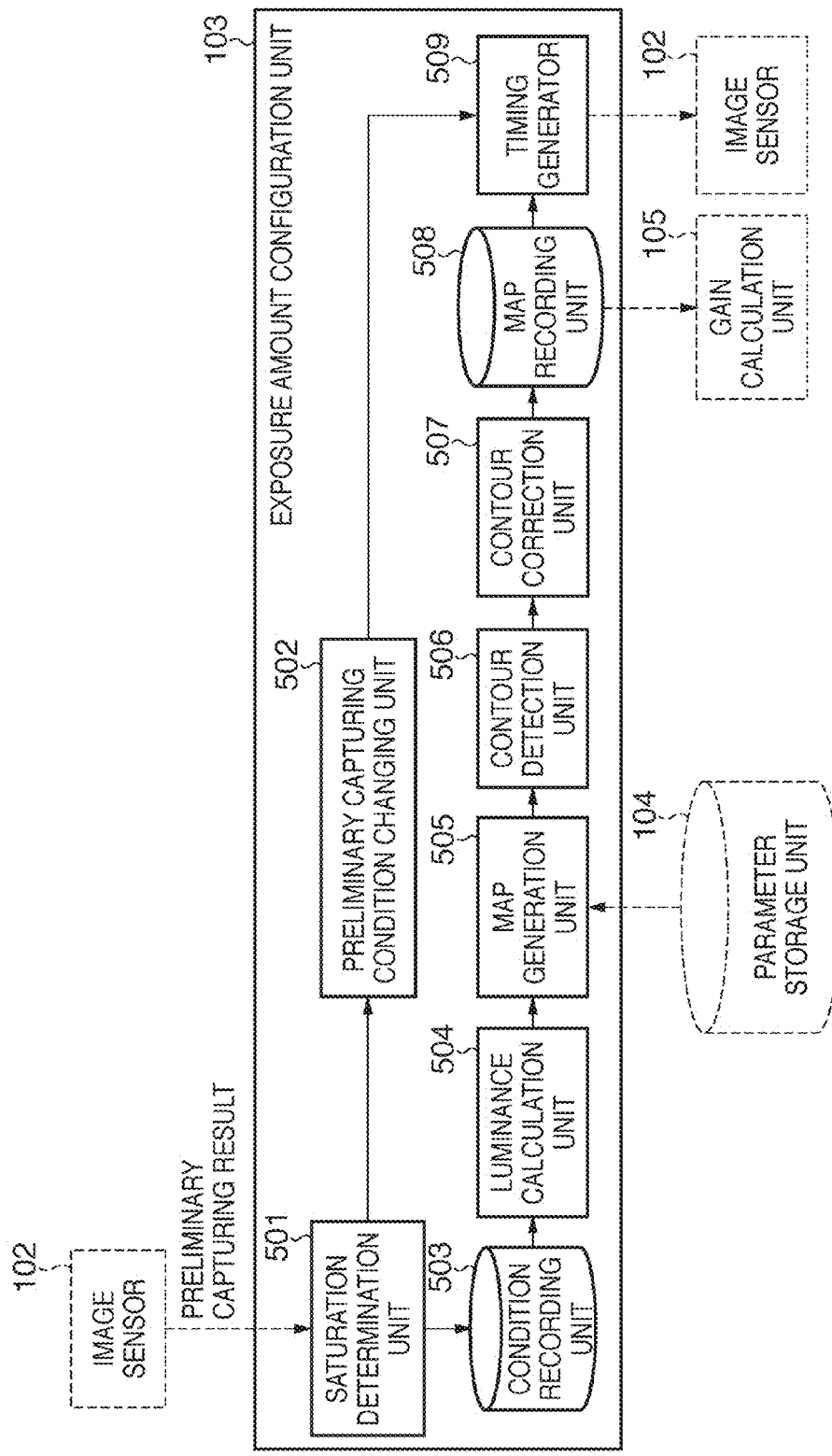
FIG. 5 is a block diagram showing the detailed arrangement of an exposure amount configuration unit according to the first embodiment.

The exposure amount configuration unit 103 according to this embodiment performs the processing of determining whether another preliminary capturing is needed or not (step S203) and the processing of configuring the exposure amount for each pixel (step S205). Before a detailed description of these processes, the detailed arrangement of the exposure amount configuration unit 103 will be explained with reference to the block diagram of FIG. 5.

The exposure amount configuration unit 103 includes a saturation determination unit 501, which determines whether preliminary capturing data includes a saturated pixel. A preliminary capturing condition changing unit 502 changes preliminary capturing conditions based on the saturation determination result. A capturing condition recording unit 503 records, for each pixel, capture conditions that do not cause saturation. A luminance calculation unit 504 calculates the luminance of each pixel based on the capturing conditions recorded by the capturing condition recording unit 503. A map generation unit 505 generates a pixel map indicating light/dark regions (to be referred to as a map of light and dark regions hereinafter) based on the parameters for the boundary luminance held in the parameter storage unit 104 and luminance information calculated by the luminance calculation unit 504.

A contour detection unit 506 detects the boundary between a light region and a dark region as a contour based on the map of light and dark regions. A contour correction unit 507 corrects the contour detected on the map of light and dark regions. Note that an exposure period map according to this embodiment is generated from the map of light and dark regions after the contour correction processing.

A map recording unit 508 records the generated exposure period map. A timing generator 509 generates a transistor driving pulse for each pixel of the CMOS sensor based on the exposure period map. Note that the information recorded in the map recording unit 508 is also used in the gain correction of the succeeding stage.

Processing of Determining Whether Another Preliminary Capturing is Needed or not (S203)

Figure 6:
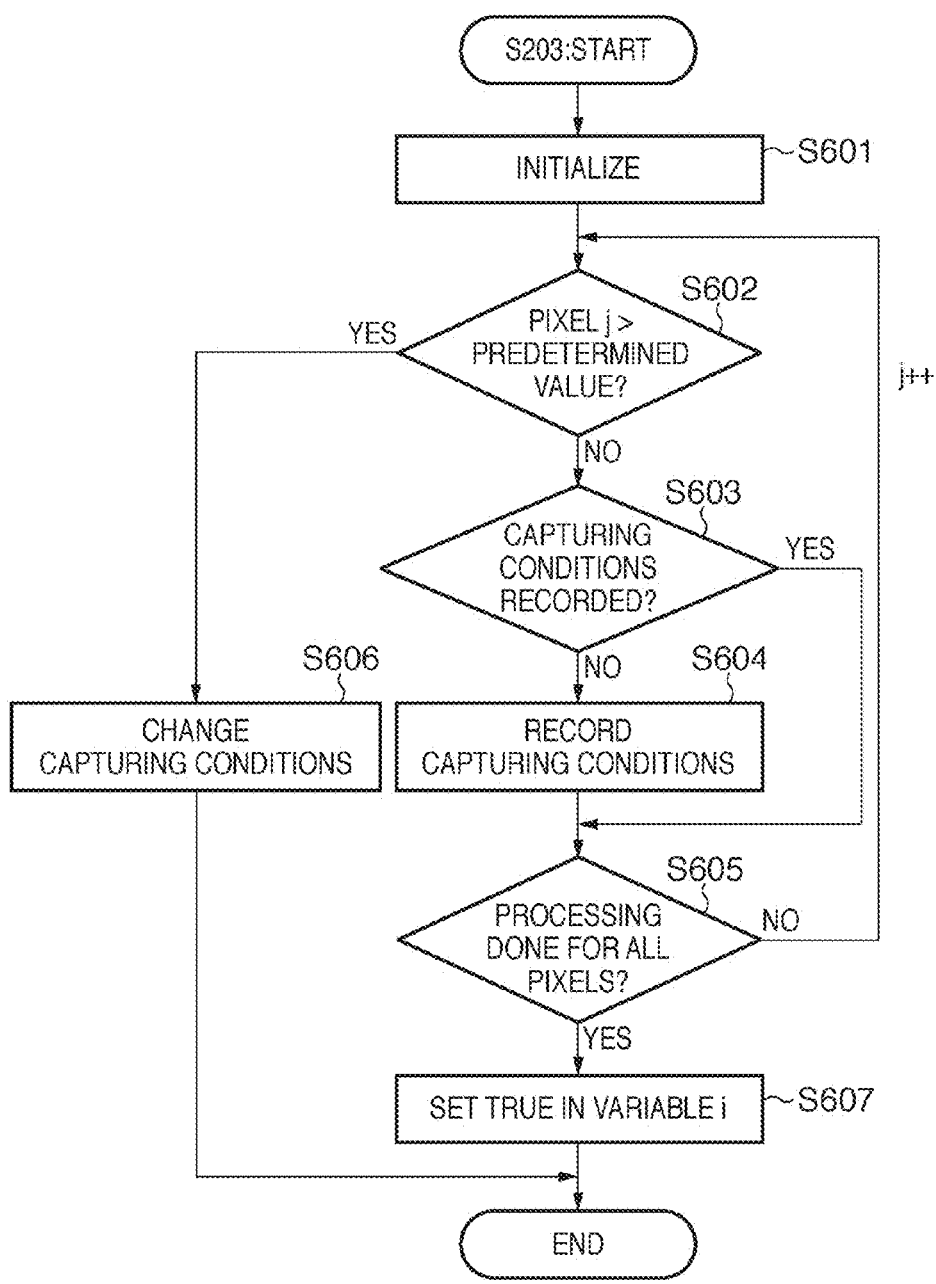
FIG. 6 is a flowchart illustrating processing of determining whether another preliminary capturing is needed or not according to the first embodiment.

The processing of determining whether another preliminary capturing is needed or not, which is performed in step S203 by the exposure amount configuration unit 103, will be described below with reference to the flowchart of FIG. 6. The processing of determining whether another preliminary capturing is needed or not according to this embodiment includes saturated pixel detection processing (corresponding to step S602 to be described later), processing of determining whether change of the preliminary capturing conditions is needed or not (corresponding to step S606), and capturing condition recording processing (corresponding to step S604).

First, in step S601, the exposure amount configuration unit 103 performs initialization. For example, the exposure amount configuration unit 103 sets 0 to a pixel number j, which indicates a pixel in the preliminary capturing data, and allocates a memory.

In step S602, the exposure amount configuration unit 103 compares the value of the pixel j with a predetermined threshold. If the value of the pixel j is smaller than the threshold, the process advances to step S603. Otherwise, the process advances to step S606. As the predetermined threshold, for example, a parameter for the boundary luminance configured in step S201 of FIG. 2 can be used. As the threshold, a maximum value where linearity can be kept between a luminance and a value from the CMOS sensor of the image sensor 102 (saturation threshold), can be used. However, any other value acquirable by the sensor is applicable as the threshold.

Figures 7, 8:
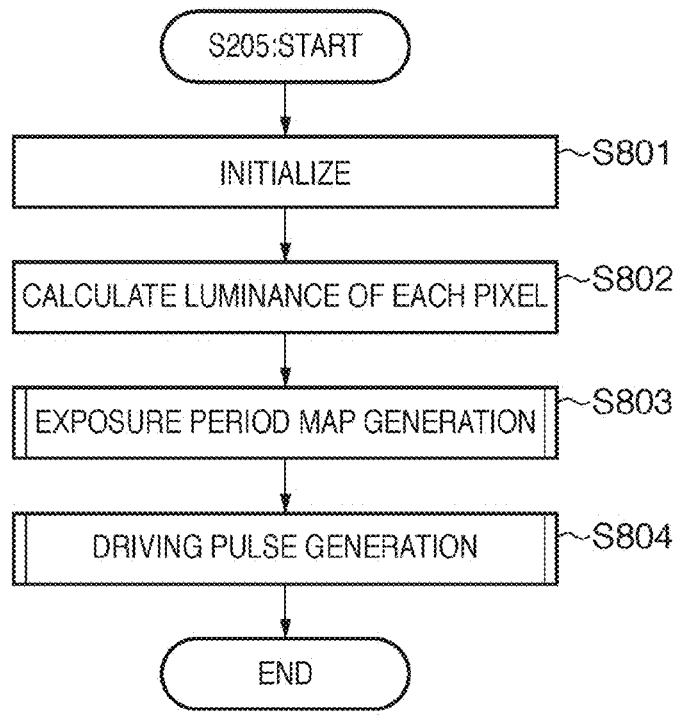
FIG. 7 is a view showing a recording example of capturing condition according to the first embodiment.
FIG. 8 is a flowchart illustrating processing of configuring an exposure amount for each pixel according to the first embodiment.

If the pixel j is not saturated, the exposure amount configuration unit 103 determines in step S603 whether capturing conditions for the pixel j are recorded in the capturing condition recording unit 503. If no capturing conditions are recorded, the process advances to step S604, and the exposure amount configuration unit 103 stores the capturing conditions. The capturing conditions can be an f-number, shutter speed, ISO sensitivity, and pixel values. Note that the capturing conditions recorded here are stored in the capturing condition recording unit 503 in correspondence with a pixel number j, as shown in the table of FIG. 7. On the other hand, if capturing conditions for the pixel j are recorded in step S603, the process advances to step S605. In step S605, the exposure amount configuration unit 103 determines whether the capturing condition recording processing has been done for all pixels. If the recording has been done, the process advances to step S607. Otherwise, the exposure amount configuration unit 103 increments the pixel number j by one, and the process returns to step S602.

In step S607, the exposure amount configuration unit 103 sets TRUE in the variable i representing the end of preliminary capturing. The exposure amount configuration unit 103 performs termination processing.

On the other hand, if the pixel j is saturated, the preliminary capturing condition changing unit 502 changes the capturing conditions in step S606 so as to shorten the shutter speed. The timing generator 509 generates driving pulses for the CMOS sensor to set the same conditions for all pixels, that is, uniform the exposure amount for all pixels. Then, the exposure amount configuration unit 103 performs termination processing.

As described above, in the processing of determining whether another preliminary capturing is needed or not according to this embodiment, if the preliminary capturing data includes a pixel whose value is larger than a predetermined threshold, it is determined that saturation had occurred, and the capturing conditions are changed for another preliminary capturing. At this time, the variable i remains FALSE. If no saturated pixel exists, TRUE is set in the variable i, and the end of preliminary capturing is instructed.

Processing of Configuring Exposure Amount for Each Pixel (S205)

The processing of configuring the exposure amount for each pixel in step S205 will be described below with reference to the flowchart of FIG. 8. Note that the operation of configuring the exposure amount according to this embodiment includes the following three processes: luminance calculation processing of calculating the luminance of each pixel (corresponding to step S802 to be described later), exposure period map generation processing of generating an exposure period map from the boundary luminance and the luminance value of each pixel (corresponding to step S803), and processing of generating driving pulses for transistors (corresponding to step S804).

First, in step S801, the luminance calculation unit 504 reads out the f-number, shutter speed, ISO sensitivity, and the luminance value of each pixel stored in the capturing condition recording unit 503 as shown in FIG. 7. The luminance calculation unit 504 also performs initialization to, for example, allocate a memory.

In step S802, the luminance calculation unit 504 calculates a luminance by equations (1) to (6) below based on the capturing condition information shown in FIG. 7, which is acquired in step S801.

Let j be the pixel number, Pj be the pixel value, PBj be the luminance value of the pixel, Fj be the f-number, Tj be the shutter speed, ISOj be the ISO sensitivity, Bj be the appropriate object luminance, AVj be an APEX value representing the f-number, TVj be an APEX value representing the shutter speed, SVj be an APEX value representing the ISO sensitivity, and BVj be an APEX value representing the object luminance.

First, the APEX values for the pixel number j are calculated based on the capturing conditions by $$AVj = 2\log_2(Fj) \quad (1)$$

$$TVj = -\log_2(Tj) \quad (2)$$

$$SVj = \log_2(ISOj/3.125) \quad (3)$$

Next, the APEX value of the object luminance is calculated by $$BVj = AVj + TVj - SVj \quad (4)$$

Then, the object luminance is calculated by $$Bj = 2^{BVj} \times N/K \quad (5)$$

where N and K are constants.

Next, the luminance for the pixel number j is calculated by $$PBj = Bj \times (Pj/\text{maximum signal value}) \times (100/18) \quad (6)$$

When the luminance of each pixel is calculated in the above-described way, an exposure period map is generated in step S803. The map recording unit 508 holds the generated exposure period map. Note that the exposure period map generation processing will be described later in detail.

In step S804, the timing generator 509 generates driving pulses for the transistors of the CMOS sensor based on the exposure period map held in the map recording unit 508. Note that the driving pulse generation processing will be described later in detail.

Exposure Period Map Generation Processing (S803)

Figure 9:
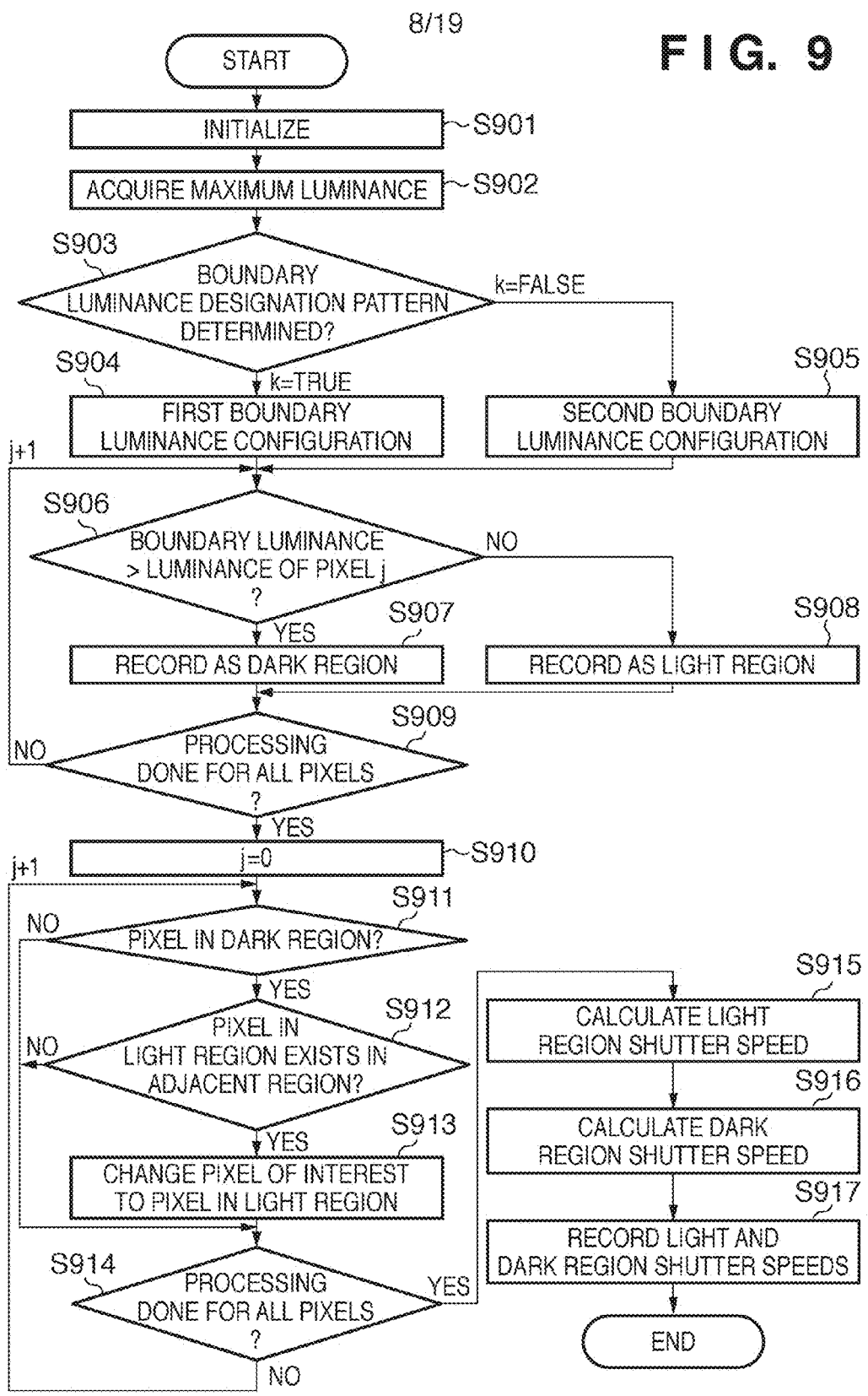
FIG. 9 is a flowchart illustrating exposure period map generation processing according to the first embodiment.

The exposure period map generation processing in step S803 will be described below with reference to the flowchart of FIG. 9.

First, in step S901, the parameters for the boundary luminance are read out. In addition, the f-number, ISO sensitivity, and the luminance value of each pixel stored in the capturing condition recording unit 503 are read out. Initialization is also performed to, for example, allocate a memory.

In step S902, the luminance values of all pixels are scanned to acquire a maximum luminance value MB.

In step S903, the method of designating the parameters for the boundary luminance is determined. More specifically, if the variable k representing the method of designating the parameters for the boundary luminance is TRUE, the process advances to step S904. Otherwise, the process advances to step S905.

In step S904, first boundary luminance configuration is performed based on the parameters for the boundary luminance (the position and size of the main object window) configured using the UI shown in FIG. 3A. More specifically, the boundary luminance is calculated and configured by equations (7) and (8) below based on the luminance information of the designated region represented by the parameters for the boundary luminance and the maximum luminance value MB acquired in step S902. A region having a luminance equal to or higher than the boundary luminance is defined as a first region, that is, light region. A region having a luminance lower than the boundary luminance is defined as a second region, that is, dark region. When controlling the exposure amount at the time of image capturing, an exposure amount larger than in a light region should be applied to a dark region. Let m×n be the size of the designated region, PBk be the luminance of each pixel in the designated region, PBave be the average luminance, and SB be the boundary luminance.

$$PBave = \Sigma(PBk/(m \times n)) \quad (7)$$

where $\Sigma$ is Sum for m×n pixels.

$$SB = PBave \times (100/18) \quad (8)$$

In step S905, second boundary luminance configuration is performed based on the parameter for the boundary luminance (the relative luminance of the main object) configured using the UI shown in FIG. 3B. More specifically, based on the maximum luminance value MB acquired in step S902 and the parameter for the boundary luminance, the boundary luminance SB is calculated and configured by $$SB = \text{parameter for boundary luminance} \times MB \quad (9)$$

In step S906, the luminance value for the pixel number j is compared with the boundary luminance SB configured in step S904 or S905. If the luminance value for the pixel number j is smaller than the boundary luminance SB, the process advances to step S907 to record 0 representing a dark region at a corresponding position of the map of light and dark regions. On the other hand, if the luminance value for the pixel number j is equal to or larger than the boundary luminance SB, the process advances to step S908 to record 1 representing a light region at a corresponding position of the map of light and dark regions.

Figure 10A:
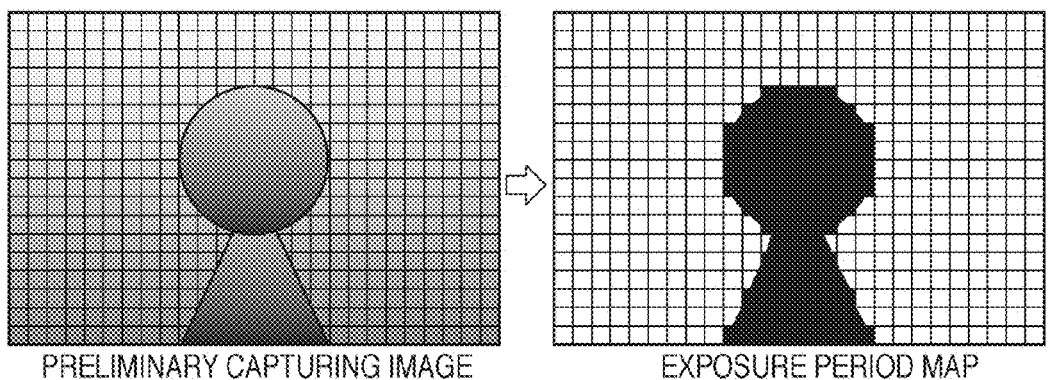
FIGS. 10A to 10C are views schematically showing a map of light and dark regions according to the first embodiment.
Figure 10B:
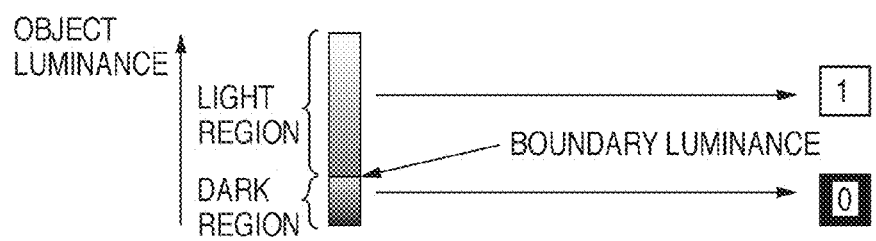

FIG. 10A shows an example of the map of light and dark regions in which each pixel is expressed as a dark region or a light region. As shown in FIG. 10B, the map of light and dark regions is formed by binarizing each pixel of a preliminary capturing image using the boundary luminance as a threshold.

In step S909, it is determined whether the processing of generating the map of light and dark regions has been done for all pixels. If the processing has been done, the process advances to step S910. Otherwise, the pixel number j is incremented by one, and the process returns to step S906 to process the next pixel. The processing up to this point is executed by the map generation unit 505.

In step S910, the pixel number j is reset to 0 again. In step S911, it is determined whether the pixel of the pixel number j (jth pixel) has been recorded as a pixel in a dark region. If the pixel is a pixel in a dark region, the process advances to step S912. If the pixel is a pixel in a light region, the process advances to step S914.

If the pixel is a dark region, it is determined in step S912 whether eight pixels around the pixel (pixel of interest) of the pixel number j include a pixel in a light region which is different from the pixel of interest. If a pixel in a light region exists, the process advances to step S913. In step S913, the map of light and dark regions is changed to change the pixel of interest to a pixel in a light region, in order to give the processed map, and the process advances to step S914. On the other hand, if no pixel in a light region exists around the pixel of interest, the process directly advances to step S914.

Note that the pixels referred to in step S913 can be decided in accordance with, for example, an error predicted based on the time lag between preliminary capturing and main capturing, or on an object blur during the exposure period. For example, the same determination processing may be done for all eight pixels around the pixel j and also for all 14 pixels around them.

The above-described determination processing in steps S911 and S912 is the contour detection processing of this embodiment, which is performed by the contour detection unit 506. The region correction processing in step S913 is the contour correction processing of this embodiment, which is performed by the contour correction unit 507. With the contour correction processing, the light region (short-period exposure region) is expanded toward the adjacent dark region (long-period exposure region) by a predetermined amount, on the map of light and dark regions. This can prevent a pixel that should be in the light region from erroneously being determined as a pixel in a dark region and subjected to long-period exposure to cause saturation of the incident light amount. That is, it is possible to prevent any wrong tone or pseudo-contour at the boundary of exposure control.

Figure 10C:
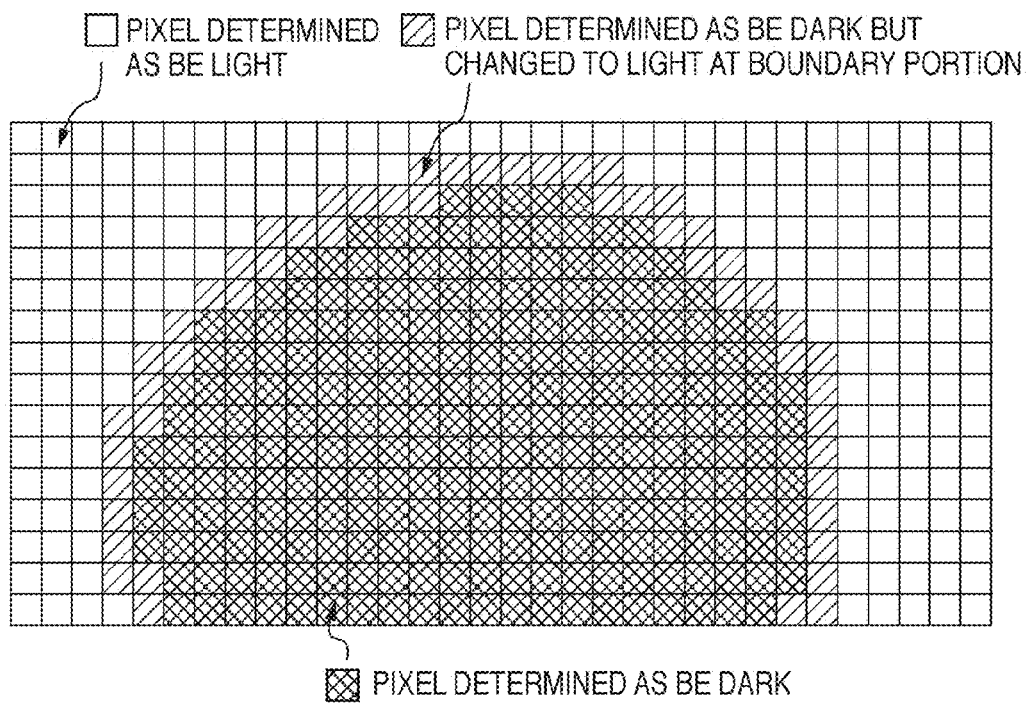

FIG. 10C shows an example of a map of light and dark regions which has undergone the above-described contour correction. As is apparent from FIG. 10C, the map of light and dark regions is corrected (contour correction) such that pixels determined as pixels in a dark region at the boundary between the light region and the dark region are changed to pixels in a light region. The map of light and dark regions that has undergone the contour correction is used as an exposure period map in subsequent processing.

In step S914, it is determined whether the processing has been done for all pixels. If the processing has been done, the process advances to step S915. Otherwise, the pixel number j is incremented by one, and the process returns to step S911.

In step S915, a shutter speed Tlight to be applied to the light region is calculated by equations (10) to (12) below.

First, BVlight that is the APEX value of the main object luminance is obtained using the boundary luminance SB by $$BVlight = \log_2(SB \times N/K) \qquad (10)$$

Next, an APEX value AVlight of the f-number and an APEX value SVlight of the ISO sensitivity are obtained using equations (1) and (3). Based on these values, an APEX value TVlight of the shutter speed is obtained by $$TVlight = SVlight + BVlight - AVlight \qquad (11)$$

Finally, the shutter speed Tlight for the light region is calculated as follows. The shutter speed Tlight corresponds to short-period exposure according to this embodiment.

$$Tlight = 2^{-TVlight} \qquad (12)$$

In step S916, a shutter speed Tdark to be applied to the dark region is calculated by equations (13) to (15) below. The shutter speed Tdark corresponds to long-period exposure according to this embodiment.

First, BVdark that is the APEX value of the main object luminance, is obtained using the maximum luminance value MB by $$BVdark = \log_2(MB \times N/K) \qquad (13)$$

Next, an APEX value AVdark of the f-number and an APEX value SVdark of the ISO sensitivity are obtained using equations (1) and (3). Based on these values, an APEX value TVdark of the shutter speed is obtained by $$TVdark = SVdark + BVdark - AVdark \qquad (14)$$

Finally, the shutter speed Tdark for the dark region is calculated.

$$Tdark = 2^{-TVdark} \qquad (15)$$

In step S917, the calculated shutter speeds (Tlight and Tdark) to be applied to the light region and dark region, respectively, are stored in association with the exposure period map. Note that the storage of the shutter speeds is not particularly limited. For example, the shutter speeds may be added to the exposure period map. Each of the binary values set in the exposure period map may be replaced with a corresponding shutter speed value, and the replaced value may be held.

As described above, according to this embodiment, preliminary capturing data is binarized first based on a boundary luminance configured using a UI. Region setting is done in accordance with an exposure amount to be applied, thereby creating an exposure period map. Region correction using contour correction is performed for the exposure period map. Then, a shutter speed corresponding to each value on the exposure period map is calculated.

Note that in this embodiment, an example has been described in which the exposure period map representing the shutter speed is created based on the preliminary capturing data. However, it is sufficient for the exposure period map to have the exposure amount for each pixel on the map. Hence, an exposure period map may be created as an exposure amount map on which parameters representing exposure amounts are configured.

Detailed Arrangement of Image Sensor 102

The image sensor 102 of this embodiment is formed with a CMOS sensor. The transistors of the CMOS sensors are driven for each pixel in accordance with the exposure period map created in the above-described manner, thereby controlling the length of the exposure period for each pixel.

Exposure control according to this embodiment, that is, the processing of generating driving pulses for the transistors in step S804, will be described below. The arrangement and operation of the image sensor 102 will be described first in detail.

Figure 12:
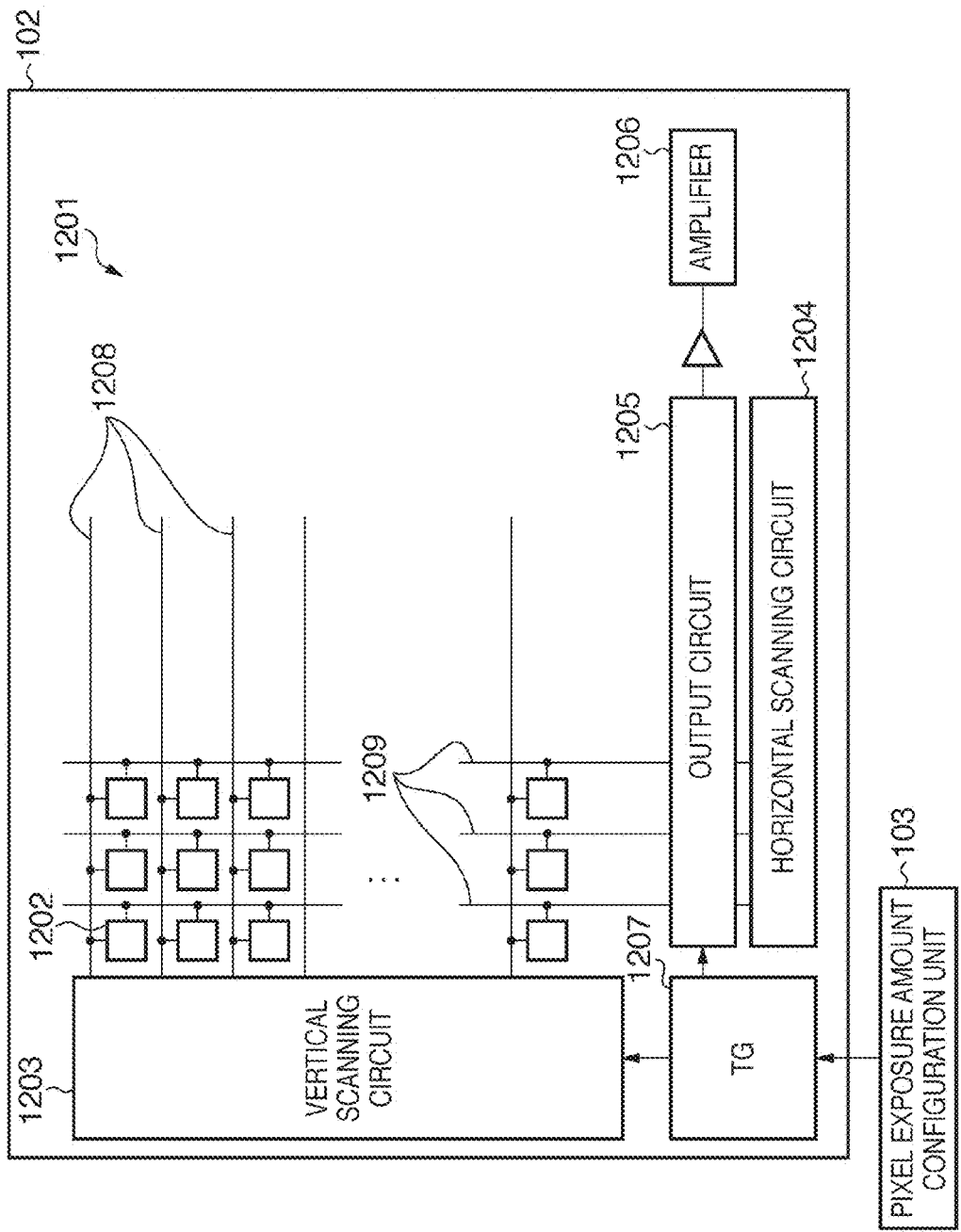
FIG. 12 is a block diagram showing the detailed arrangement of an image sensor according to the first embodiment.

FIG. 12 is a block diagram showing the detailed arrangement of the image sensor 102. Referring to FIG. 12, reference numeral 1201 denotes an image sensing plane. The image sensing plane 1201 has a plurality of pixels 1202 arrayed horizontally and vertically. The image sensing plane 1201 also includes constituent elements such as a vertical scanning circuit 1203, horizontal scanning circuit 1204, output circuit

1205, output amplifier 1206, and timing generator 1207. Each of the pixels 1202 arrayed horizontally is connected to the vertical scanning circuit 1203 via a row selection line 1208. Similarly, each of the pixels 1202 arrayed vertically is connected to the horizontal scanning circuit 1204 and the output circuit 1205 via a column selection line 1209.

Based on the exposure amount configuration done by the exposure amount configuration unit 103, the image capturing operation of the image sensor 102 is performed in accordance with driving pulses generated by the timing generator 1207. Each pixel 1202 controls readout or reset by turning on/off transistors corresponding to the driving pulses. Charges read by each pixel 1202 are converted into a voltage. The converted voltage is transferred from the horizontal scanning circuit 1204 to the output circuit 1205 and then to the amplifier 1206.

Figure 13:
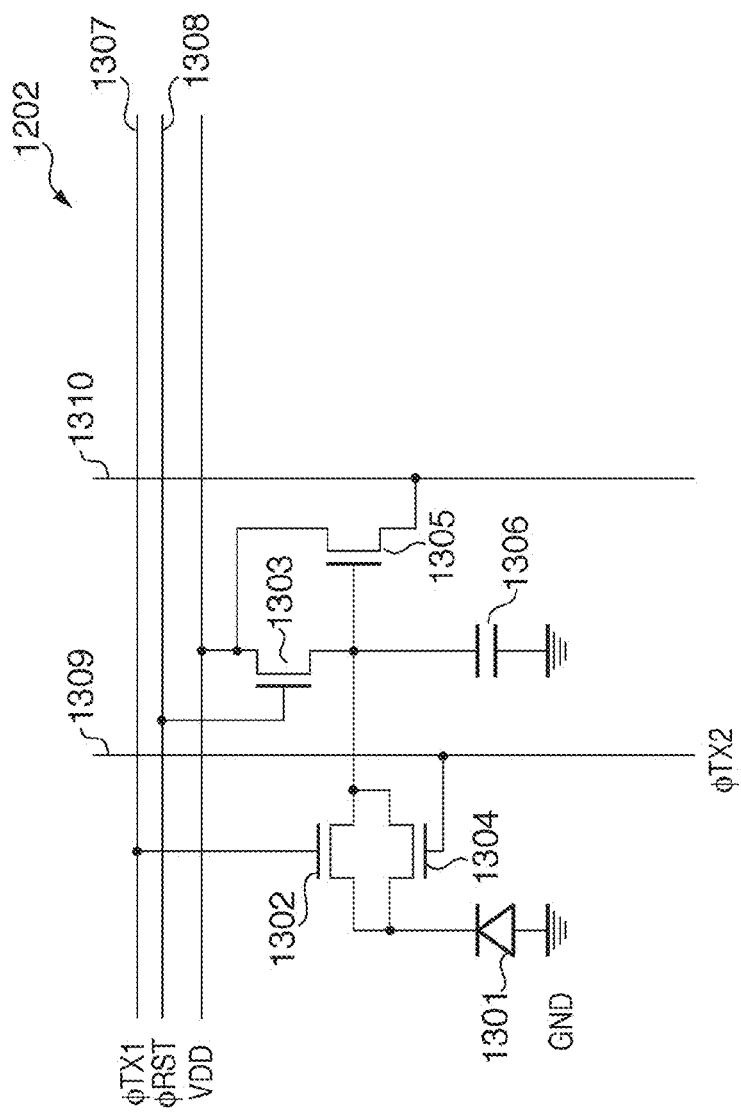
FIG. 13 is a circuit diagram showing an example of the circuit arrangement of the image sensor according to the first embodiment.

FIG. 13 illustrates an example of the circuit arrangement of the pixel 1202 of the image sensor (CMOS sensor) 102.

The pixel 1202 includes a buried PD (photodiode) 1301 and four n-channel MOS transistors (to be simply referred to as transistors hereinafter) 1302 to 1305. The drains of the transistors 1302 and 1304 and the source connection portion of the transistor 1303 are formed from an FD (Floating Diffusion) 1306. Row signal lines 1307 and 1308 and column signal lines 1309 and 1310 represent signal lines for the transistors. VDD represents a power supply; and GND, ground. Note that each gate is turned on when a corresponding signal is H (High) and off when the signal is L (Low).

The PD 1301 serves as a photoelectric conversion unit which accumulates charges corresponding to the incident light amount from an object, that is, charges obtained by photoelectrically converting incident light. The accumulated signal charges are output as the row transfer transistor 1302 or column transfer transistor 1304 called a transfer gate completely transfers them to the FD 1306. The transferred signal charges are accumulated in the FD 1306. Note that the potential (row transfer pulse) of the row transfer transistor 1302 is represented by $\phi TX1$, and the potential (column transfer pulse) of the column transfer transistor 1304 is represented by $\phi TX2$.

The transistor 1303 is called a reset transistor. The transistor 1303 is turned on to reset the FD 1306 to a predetermined potential ($\phi RSB$). In this reset operation, noise (reset noise) may be generated to make the potential of the FD 1306 vary from $\phi RSB$. Note that the potential (reset pulse) of the reset transistor 1303 is represented by $\phi RST$.

The transistor 1305 forms a source follower amplification circuit. The transistor 1305 has a function of lowering the output impedance by performing current amplification for a potential VFD of the FD 1306. The drain of the transistor 1305 is connected to the column signal line 1310 so that the potential of the FD is derived to the column selection line 1209 as a pixel output Vout at low impedance.

Scheme of Driving CMOS Sensor

The scheme of driving the pixels 1202 of the CMOS sensor and its characteristics will be described below with reference to FIGS. 14A to 14D.

FIG. 14A is a timing chart showing a driving method of ON/OFF-controlling the transistors 1302 and 1304 serving as transfer gates and the reset transistor 1303. Referring to FIG. 14A, t11 to t15 represent timings.

In FIG. 14A, at the timing t11, the gates of the reset transistor 1303 and the row transfer transistor 1302 (corresponding to $\phi RST$ and $\phi TX1$, respectively) are turned on. Charges in the PD 1301 are thus completely transferred to the FD 1306 to reset the PD. The FD 1306 is also reset to the drain potential of the reset transistor 1303. At the timing t12, the gate of the row transfer transistor 1302 is turned off to start accumulating charges in the PD 1301. At this time, since the reset transistor 1303 remains on, noise generated in the FD 1306 during exposure is removed before turning on the gate of the column transfer transistor 1304. Note that a description of the states of transistors whose operations do not change will be omitted hereinafter.

At the timing t13, the reset transistor 1303 is turned off, and the gate of the column transfer transistor 1304 (corresponding to $\phi TX2$) is turned on. Charges accumulated in the PD 1301 in accordance with light from the object are then completely transferred to the FD 1306. At the timing t14, the gate of the column transfer transistor 1304 is turned off to turn on the transistor 1305. The potential of the FD 1306 is then at low impedance and derived to the output circuit 1205 as the pixel output Vout. At the timing t15, deriving to the output circuit 1205 ends.

In this embodiment, column transfer pulses are transmitted to the pixels 1202 in one row at two kinds of timings, thereby controlling the length of the exposure period. Exposure period control according to the column transfer timings will be explained below with reference to FIGS. 14B and 14C. Exposure period control according to this embodiment is performed by providing each column transfer transistor with one of the two kinds of ON timings.

FIG. 14B is a schematic view showing exposure amounts which the exposure amount configuration unit 103 assigns to the pixels of the m:th to (m+4)th columns in the n:th row. A white portion indicates long-period exposure, and a hatched portion indicates short-period exposure. FIG. 14C is a timing chart showing a driving method of ON/OFF-controlling the row transfer transistors 1302, column transfer transistors 1304, and reset transistors 1303 for the pixels of the m:th to (m+4)th columns in the n:th row.

Referring to FIG. 14C, at timing t21, the gates of all the reset transistors 1303 in the n:th row and all the row transfer transistors 1302 in the n:th row are turned on. Charges in all the PDs 1301 in the n:th row are thus completely transferred to the FDs 1306 to reset the PDs. All the FDs 1306 in the n:th row are also reset to the drain potential of the reset transistors 1303. At timing t22, the gates of all the row transfer transistors 1302 in the n:th row are turned off to start accumulating charges in all the PDs 1301 in the n:th row.

At timing t23, the reset transistors 1303 are turned off, and the gates of the column transfer transistors 1304 of the (m+1)th, (m+2)th, and (m+4)th columns for short-period exposure are turned on. Charges accumulated in the PDs 1301 in accordance with light from the object are then completely transferred to the FDs 1306.

At timing t24, the gates of the column transfer transistors 1304 of the (m+1)th, (m+2)th, and (m+4)th columns for short-period exposure are turned off, and the transistors 1305 are turned on. The potential of the FDs 1306 is then at low impedance and derived to the output circuit 1205 as a short-period pixel output VoutS. After deriving to the output circuit 1205, the reset transistors 1303 are turned on, and the column transfer transistors 1304 are turned off. At timing t25, deriving of the short-period pixel output VoutS to the output circuit 1205 ends.

Next, at timing t26, the reset transistors 1303 are turned off, and the gates of the column transfer transistors 1304 of the m:th and (m+3)th columns for long-period exposure are turned on. Charges accumulated in the PDs 1301 in accordance with light from the object are then completely transferred to the FDs 1306.

At timing t27, the gates of the column transfer transistors 1304 of the m:th and (m+3)th columns for long-period exposure are turned off, and the transistors 1305 are turned on. The potential of the FDs 1306 is then at low impedance and derived to the output circuit 1205 as a long-period pixel output VoutL. At timing t28, deriving of the long-period pixel output VoutL to the output circuit 1205 ends.

In the above-described way, readout in one row is done by the control shown in FIG. 14C. FIG. 14D shows a timing chart of such readout over rows. FIG. 14D is a timing chart showing a driving method of ON/OFF-controlling the row transfer transistors 1302, column transfer transistors 1304, and reset transistors 1303 for the n:th to (n+2)th rows.

Referring to FIG. 14D, at timing t31, all the reset transistors 1303 in the n:th row are turned on. Additionally, the gates of all the row transfer transistors 1302 in the n:th row are turned on. Charges in all the PDs 1301 in the n:th row are thus completely transferred to the FDs 1306 to reset the PDs. All the FDs 1306 in the n:th row are also reset to the drain potential of the reset transistors 1303.

At timing t32, the gates of all the row transfer transistors 1302 in the n:th row are turned off to start accumulating charges in all the PDs 1301 in the n:th row.

At timing t33, all the reset transistors 1303 in the n:th row are turned off. In addition, the gates of the column transfer transistors 1304 in the n:th row, where the transistors are in the columns for short-period exposure, are turned on. Charges accumulated in the PDs 1301 in accordance with light from the object are then completely transferred to the FDs 1306.

At timing t34, the gates of the column transfer transistors 1304 in the n:th row, where the transistors are in the columns for short-period exposure, are turned off. In addition, the transistors 1305 in the n:th row are turned on. The potential of the FDs 1306 is then at low impedance and derived to the output circuit 1205 as a short-period pixel output Voutn_S of the n:th row. After deriving to the output circuit 1205, all the reset transistors 1303 in the n:th row are turned on. At timing t35, deriving of the short-period pixel output Voutn_S to the output circuit 1205 ends.

Next, at timing t36, all the reset transistors 1303 in the n:th row are turned off. In addition, the gates of the column transfer transistors 1304 in the n:th row, where the transistors are in the columns for long-period exposure, are turned on. Charges in the PDs 1301 are thus completely transferred to the FDs 1306.

At timing t37, the gates of the column transfer transistors 1304 in the n:th row, where the transistors are in the columns for long-period exposure, are turned off. In addition, the transistors 1305 in the n:th row are turned on. The potential of the FDs 1306 is then at low impedance and derived to the output circuit 1205 as a long-period pixel output Voutn_L of the n:th row. In addition, all the reset transistors 1303 in the (n+1)th row are turned on, and the gates of all the row transfer transistors 1302 in the (n+1)th row are turned on. Charges in all the PDs 1301 in the (n+1)th row are thus completely transferred to the FDs 1306 to reset the PDs. All the FDs 1306 in the (n+1)th row are also reset to the drain potential of the reset transistors 1303 in the (n+1)th row.

At timing t38, the gates of all the row transfer transistors 1302 in the (n+1)th row are turned off to start accumulating charges in all the PDs 1301 in the (n+1)th row.

At timing t39, the reset transistors 1303 in the (n+1)th row are turned off. In addition, the gates of the column transfer transistors 1304 in the (n+1)th row, where the transistors are in the columns for short-period exposure, are turned on. Charges in the PDs 1301 are thus completely transferred to the FDs 1306. Deriving of the long-period pixel output Voutn_L to the output circuit 1205 ends.

At timing t310, the gates of the column transfer transistors 1304 in the (n+1)th row, where the transistors are in the columns for short-period exposure, are turned off. In addition, the transistors 1305 in the (n+1)th row are turned on. The potential of the FDs 1306 is then at low impedance and derived to the output circuit 1205 as a short-period pixel output Voutn+1_S of the (n+1)th row. After deriving to the output circuit 1205, the reset transistors 1303 are turned on. At timing t311, deriving of the short-period pixel output Voutn+1_S to the output circuit 1205 ends.

Next, at timing t312, the reset transistors 1303 in the (n+1)th row are turned off. In addition, the gates of the column transfer transistors 1304 in the (n+1)th row, where the transistors are in the columns for long-period exposure, are turned on. Charges in the PDs 1301 are thus completely transferred to the FDs 1306.

At timing t313, the gates of the column transfer transistors 1304 in the (n+1)th row, where the transistors are in the columns for long-period exposure, are turned off. In addition, the transistors 1305 in the (n+1)th row are turned on. The potential of the FDs 1306 is then at low impedance and derived to the output circuit 1205 as a long-period pixel output Voutn+1_L of the (n+1)th row. After deriving to the output circuit 1205, the reset transistors 1303 are turned on. In addition, all the reset transistors 1303 in the (n+2)th row are turned on, and the gates of all the row transfer transistors 1302 in the (n+2)th row are turned on. Charges in all the PDs 1301 in the (n+2)th row are thus completely transferred to the FDs 1306 to reset the PDs. All the FDs 1306 in the (n+2)th row are also reset to the drain potential of the reset transistors 1303.

At timing t314, the gates of all the row transfer transistors 1302 in the (n+2)th row are turned off to start accumulating charges in all the PDs 1301 in the (n+2)th row.

At timing t315, the reset transistors 1303 in the (n+2)th row are turned off. In addition, the gates of the column transfer transistors 1304 in the (n+2)th row, where the transistors are in the columns for short-period exposure, are turned on. Charges in the PDs 1301 are then completely transferred to the FDs 1306. Deriving of the long-period pixel output Voutn+1_L to the output circuit 1205 ends.

At timing t316, the gates of the column transfer transistors 1304 in the (n+2)th row, where the transistors are in the columns for short-period exposure, are turned off. In addition, the transistors 1305 in the (n+2)th row are turned on. The potential of the FDs 1306 is then at low impedance and derived to the output circuit 1205 as a short-period pixel output Voutn+2_S of the (n+2)th row. After deriving to the output circuit 1205, the reset transistors 1303 are turned on. At timing t317, deriving of the short-period pixel output Voutn+2_S to the output circuit 1205 ends.

Next, at timing t318, the reset transistors 1303 in the (n+2)th row are turned off. In addition, the gates of the column transfer transistors 1304 in the (n+2)th row, where the transistors are in the columns for long-period exposure, are turned on. Charges in the PDs 1301 are thus completely transferred to the FDs 1306.

At timing t319, the gates of the column transfer transistors 1304 in the (n+2)th row, where the transistors are in the columns for long-period exposure, are turned off. In addition, the transistors 1305 in the (n+2)th row are turned on. The potential of the FDs 1306 is then derived to the output circuit 1205 as a long-period pixel output Voutn+2_L of the (n+2)th row at low impedance. At timing t320, deriving of the long-period pixel output Voutn+2_L to the output circuit 1205 ends.

Processing of Generating Driving Pulses for Transistors (S804)

Figure 11:
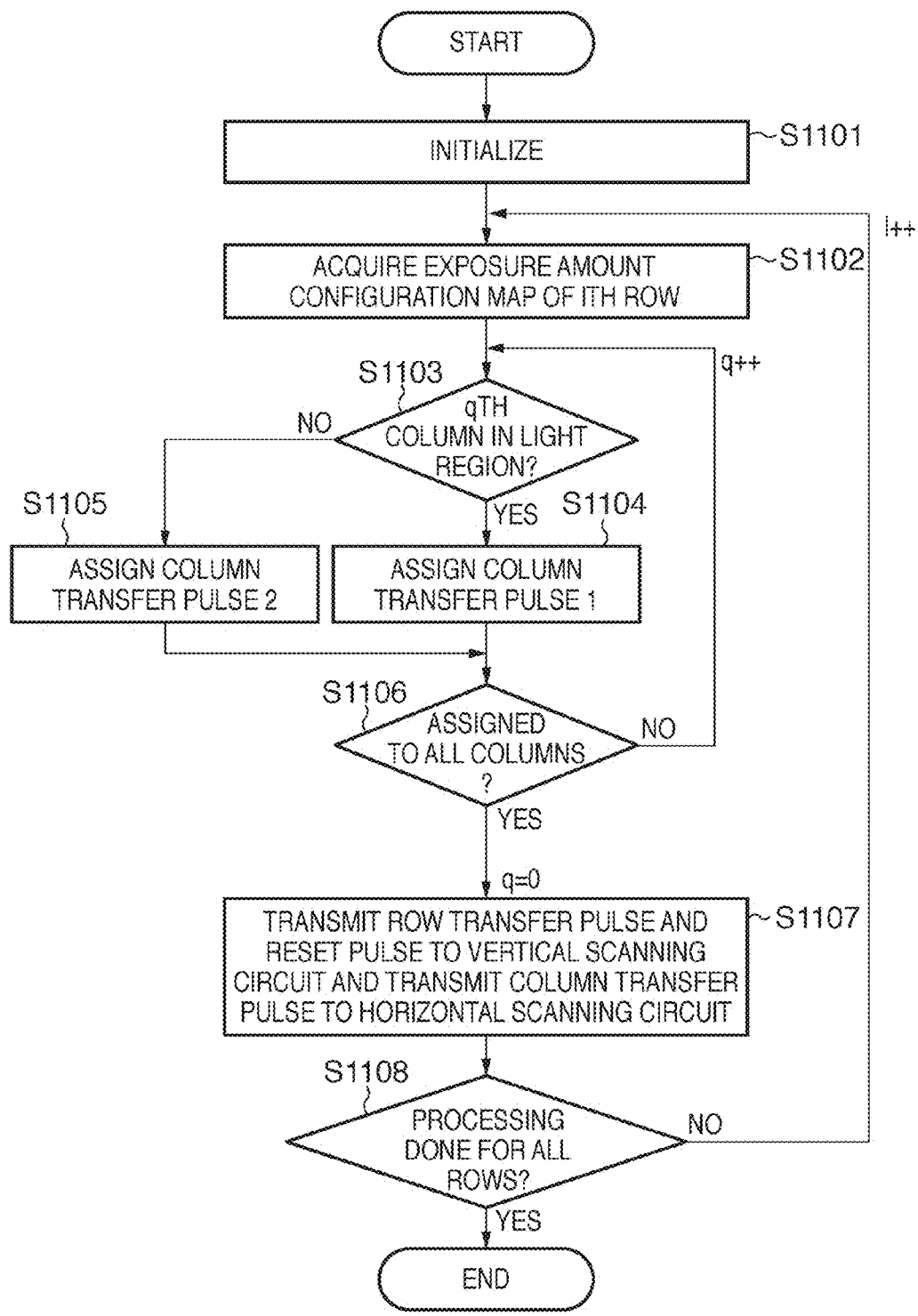
FIG. 11 is a flowchart illustrating processing of generating driving pulses for a CMOS sensor according to the first embodiment.

The processing of generating driving pulses for transistors in step S804 will be described below with reference to the flowchart of FIG. 11. More specifically, the transistors of each pixel of the CMOS sensor are controlled.

First, in step S1101, initialization is performed to, for example, set a variable l representing a row and a variable q representing a column to 0.

In step S1102, all values for the l:th row in the exposure period map are acquired.

In step S1103, it is determined, for the pixel of the q:th column in the l:th row, whether the shutter speed corresponding to the acquired value on the exposure period map is the shutter speed in the light region. If the shutter speed is that in the light region, the process advances to step S1104. Otherwise, the process advances to step S1105. In step S1104, the driving pulse (column transfer pulse 1) of the column transfer transistor 1304, corresponding to the shutter speed in the light region, is assigned to the pixel of the q:th column in the l:th row. Similarly, in step S1105, the driving pulse (column transfer pulse 2) of the column transfer transistor 1304, corresponding to the shutter speed in the dark region, is assigned to the pixel of the q:th column in the l:th row.

In step S1106, it is determined whether column transfer pulse assignment has been done for all columns in one row. If the assignment has been done, the variable q representing the column is set to 0, and the process advances to step S1107. Otherwise, the variable q is incremented by one, and the process returns to step S1103.

In step S1107, the driving pulses are generated for the row transfer transistors 1302 and the reset transistors 1303 of the pixels in the l:th row. The generated driving pulses are transmitted to the vertical scanning circuit 1203. In addition, the driving pulse for the column transfer transistor 1304 assigned in step S1104 or S1105 is generated. The generated driving pulse is transmitted to the horizontal scanning circuit 1204.

In step S1108, it is determined whether driving pulse transmission has been done for all rows. If the transmission has been done, the processing ends. Otherwise, the variable l representing the row is incremented by one, and the process returns to step S1102.

Gain Correction (S207)

Figure 15:
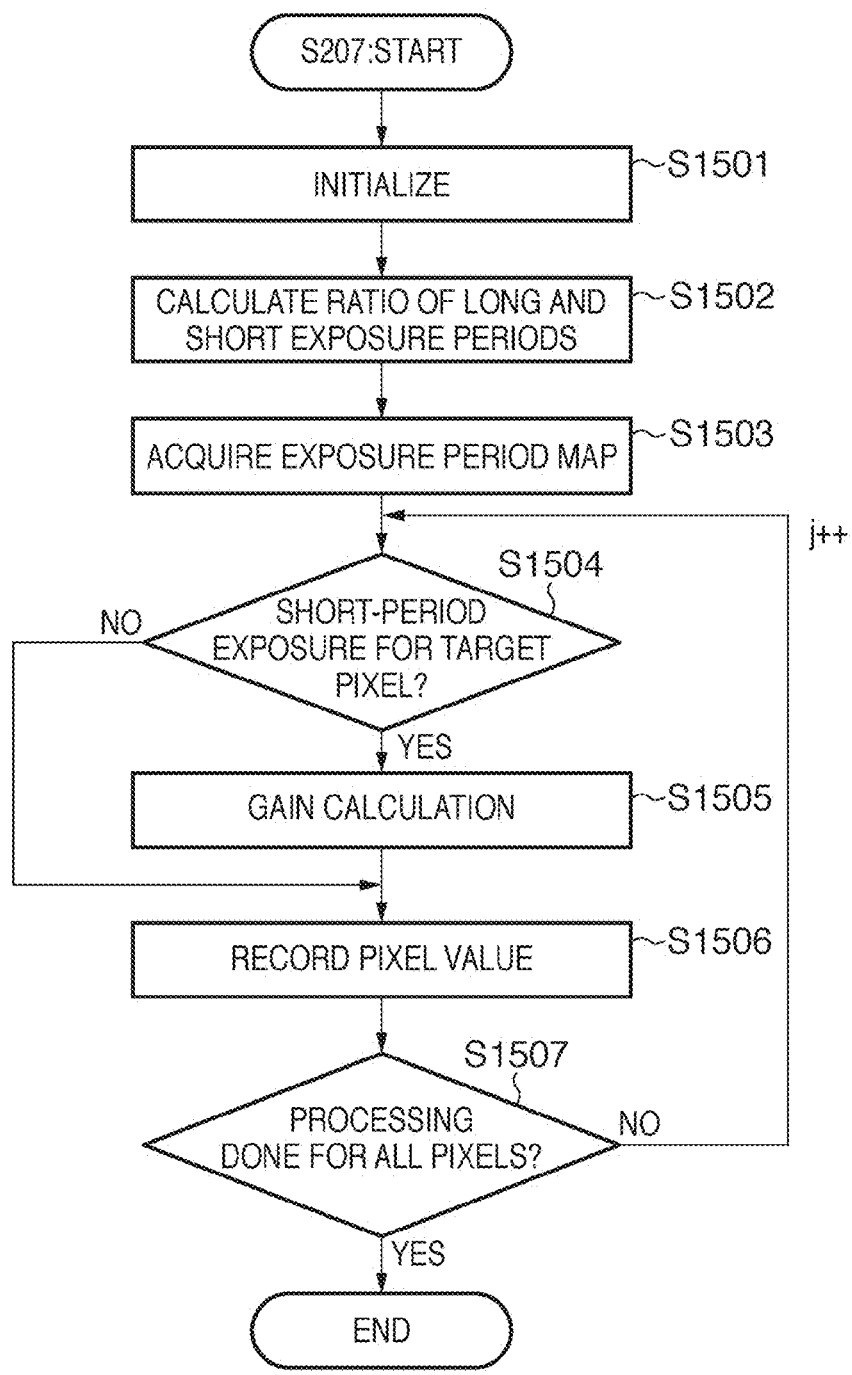
FIG. 15 is a flowchart illustrating gain correction according to the first embodiment.

The gain correction in step S207 will be described below with reference to the flowchart of FIG. 15.

First, in step S1501, 0 is set in the pixel number j. The main capturing result and the shutter speeds Tdark and Tlight for long- and short-period exposure are acquired. In addition, initialization is performed to, for example, allocate a memory.

In step S1502, the exposure period ratio is calculated. More specifically, a ratio α of the shutter speed Tlight corresponding to short-period exposure in the light region and the shutter speed Tdark corresponding to long-period exposure in the dark region on the exposure period map is calculated by $$\alpha = T\text{dark}/T\text{light} \quad (16)$$

In step S1503, the exposure period map for all pixels is acquired.

In step S1504, it is determined whether the exposure period for the pixel number j is short. If the exposure period is a short-period, that is, if the shutter speed is Tlight, the process advances to step S1505. Otherwise, the process advances to step S1506.

In step S1505, based on the pixel value Pj of the pixel number j and the exposure period ratio α, the gain calculation is performed by $$Pj = \alpha \times Pj \quad (17)$$

After that, the process advances to step S1506.

In step S1506, the pixel value Pj is recorded. In step S1507, it is determined whether the processing has been done for all pixels. If the processing has been done, it ends. Otherwise, the variable j representing the pixel number is incremented by one, and the process returns to step S1504.

As described above, according to this embodiment, the following effects can be obtained.

Based on the exposure period map created by preliminary capturing, one of two kinds of ON timings is provided to each column transfer transistor in accordance with the length of the exposure period. This allows to control the exposure period for each pixel. At this time, correction is done for the contour region at the boundary between the light region and the dark region to expand the light region to the dark region side. This enables to prevent any wrong tone or pseudo-contour in the contour region. It is therefore possible to obtain a high-quality HDR image by one-shot image capturing.

The exposure period for each pixel is assigned using the object luminance upon preliminary capturing. This enables to capture an image with high dynamic-range without highlight detail loss or shadow detail loss.

In addition, since exposure amount control is done based on the exposure period, the sensitivity for image capturing can arbitrarily be set. This allows to deal with objects with various dynamic ranges.

An HDR image can be captured by image capturing of one time. This solves the problem of, for example, misalignment caused by composition particularly when capturing a moving body.

It is also possible to solve the problem that the resolution becomes lower in HDR image capturing by fixed-pattern sensitivity arrangement, or that the noise increases when short-period exposure unsuitable for the object luminance is used.

Second Embodiment

The second embodiment of the present invention will be described below.

In the above first embodiment, an example has been described in which column transfer pulses representing two kinds of timings are transmitted to the pixels on each line of the image sensor 102, thereby controlling the exposure period. In the second embodiment, exposure period control is performed using two kinds of reset timings and one kind of column transfer pulse. High-speed pixel readout can be realized with this embodiment. Note that an image capturing apparatus 1 and an image sensor (CMOS sensor) 102 according to the second embodiment have the same arrangements as in the above-described first embodiment. The same reference numerals as in the first embodiment denote the same parts, and a description thereof will not be repeated here.

Scheme of Driving CMOS Sensor

In the second embodiment, the exposure period is controlled by providing each pixel with one of two kinds of reset timings by a row transfer transistor 1302 and a reset transistor 1303 and by a column transfer transistor 1304 and the reset transistor 1303.

Figure 16:
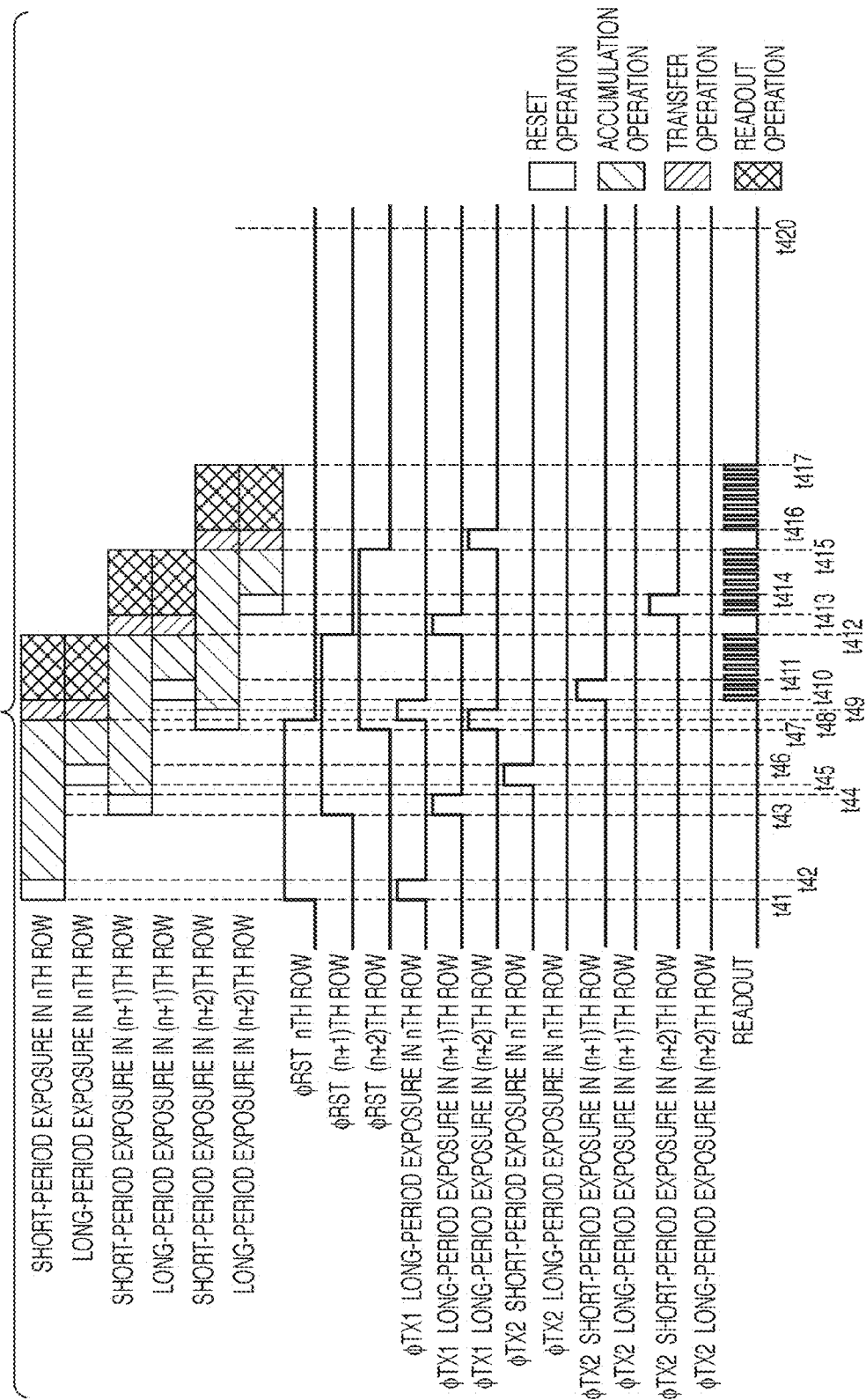
FIG. 16 is a timing chart of pixel driving clocks according to the second embodiment.

The scheme of driving pixels 1202 of the CMOS sensor according to the second embodiment and its characteristics will be described below with reference to FIG. 16. FIG. 16 is a timing chart showing a driving method of ON/OFF-controlling the transistors 1302 and 1304 serving as transfer gates and the reset transistor 1303. Referring to FIG. 16, t41 to t418 represent timings. Timing t420 is provided merely for comparison with the above-described first embodiment, and is irrelevant to the operation timing of the second embodiment.

Only operations different from the above-described first embodiment will be explained below, and a description of common parts will be omitted.

Referring to FIG. 16, at the timing t41, all the reset transistors 1303 in the n:th row are turned on. Additionally, the gates of all the row transfer transistors 1302 in the n:th row are turned on. Charges in all PDs 1301 in the n:th row are thus completely transferred to FDs 1306 to reset the PDs. All the FDs 1306 in the n:th row are also reset to the drain potential of the reset transistors 1303. At the timing t42, the gates of all the row transfer transistors 1302 in the n:th row are turned off to start accumulating charges in all the PDs 1301 in the n:th row.

At the timing t43, all the reset transistors 1303 in the (n+1)th row are turned on. Additionally, the gates of all the row transfer transistors 1302 in the (n+1)th row are turned on. Charges in all the PDs 1301 in the (n+1)th row are thus completely transferred to the FDs 1306 to reset the PDs. All the FDs 1306 in the (n+1)th row are also reset to the drain potential of the reset transistors 1303. At the timing t44, the gates of all the row transfer transistors 1302 in the (n+1)th row are turned off to start accumulating charges in all the PDs 1301 in the (n+1)th row.

At the timing t45, the gates of the column transfer transistors 1304 in the n:th row, where the transistors are in the columns for short-period exposure, are turned on. Charges in the PDs 1301 in the n:th row, where the PDs are in the columns for short-period exposure, are thus completely transferred to the FDs 1306 to reset the PDs. The FDs 1306 in the n:th row, where the FDs are in the columns for short-period exposure, are also reset to the drain potential of the reset transistors 1303. At the timing t46, the column transfer transistors 1304 in the n:th row, where the transistors are in the columns for short-period exposure, are turned off to start accumulating charges in the PDs 1301 in the n:th row, where the PDs are in the columns for short-period exposure.

Next, at the timing t47, all the reset transistors 1303 in the (n+2)th row are turned on. Additionally, the gates of all the row transfer transistors 1302 in the (n+2)th row are turned on. Charges in all the PDs 1301 in the (n+2)th row are thus completely transferred to the FDs 1306 to reset the PDs. All the FDs 1306 in the (n+2)th row are also reset to the drain potential of the reset transistors 1303. At the timing t48, all the reset transistors 1303 in the n:th row are turned off, and the gates of all the row transfer transistors 1302 in the n:th row are turned on, thereby completely transferring, to the FDs 1306, charges accumulated in the PDs 1301 in accordance with light from the object.

At the timing t49, the gates of all the row transfer transistors 1302 in the (n+2)th row are turned off to start accumulating charges in all the PDs 1301 in the (n+2)th row. At the timing t410, the gates of all the row transfer transistors 1302 in the n:th row are turned off. In addition, transistors 1305 in the n:th row are turned on. The potential of the FDs 1306 is then at low impedance and derived to an output circuit 1205 as a pixel output Voutn of the n:th row. Additionally, the gates of the column transfer transistors 1304 in the (n+1)th row, where the transistors are in the columns for short-period exposure, are turned on. Charges in the PDs 1301 in the (n+1)th row, where the PDs are in the columns for short-period exposure, are thus completely transferred to the FDs 1306 to reset the PDs. The FDs 1306 in the (n+1)th row, where the FDs are in the columns for short-period exposure, are also reset to the drain potential of the reset transistors 1303.

At the timing t411, the column transfer transistors 1304 in the (n+1)th row, where the transistors are in the columns for short-period exposure, are turned off to start accumulating charges in the PDs 1301 in the (n+1)th row, where the PDs are in the columns for short-period exposure. At the timing t412, all the reset transistors 1303 in the (n+1)th row are turned off, and the gates of all the row transfer transistors 1302 in the (n+1)th row are turned on. Charges accumulated in the PDs 1301 in accordance with light from the object are thus completely transferred to the FDs 1306.

At the timing t413, the gates of all the row transfer transistors 1302 in the (n+1)th row are turned off. In addition, all the transistors 1305 in the (n+1)th row are turned on. The potential of the FDs 1306 is then at low impedance and derived to the output circuit 1205 as a pixel output Voutn+1 of the (n+1)th row. Additionally, the gates of the column transfer transistors 1304 in the (n+2)th row, where the transistors are in the columns for short-period exposure, are turned on. Charges in the PDs 1301 in the (n+2)th row, where the PDs are in the columns for short-period exposure, are thus completely transferred to the FDs 1306 to reset the PDs. The FDs 1306 in the (n+1)th row, where the FDs are in the columns for short-period exposure, are also reset to the drain potential of the reset transistors 1303. At the timing t414, the column transfer transistors 1304 in the (n+2)th row, where the transistors are in the columns for short-period exposure, are turned off to start accumulating charges in the PDs 1301 in the (n+2)th row, where the PDs are in the columns for short-period exposure.

At the timing t415, all the reset transistors 1303 in the (n+2)th row are turned off. In addition, the gates of all the row transfer transistors 1302 in the (n+2)th row are turned on. Charges accumulated in the PDs 1301 in accordance with light from the object are thus completely transferred to the FDs 1306. At the timing t416, the gates of all the row transfer transistors 1302 in the (n+2)th row are turned off. In addition, all the transistors 1305 in the (n+2)th row are turned on. The potential of the FDs 1306 is then at low impedance and derived to the output circuit 1205 as a pixel output Voutn+2.

At the timing t417, deriving of the pixel output Voutn+2 to the output circuit 1205 ends. According to the pixel driving scheme of the above-described first embodiment, output from the pixel for short-time exposure and output from the pixel for long-time exposure in the (n+2)th row end at the timing t320 shown in FIG. 14D. As can be seen from FIG. 16, the timing t417, when all outputs in the (n+2)th row end in the second embodiment, is much earlier than the output end timing t320 of the first embodiment.

As described above, according to the second embodiment, two kinds of reset timings by the row transfer transistor 1302 and the reset transistor 1303 and by the column transfer transistor 1304 and the reset transistor 1303 are used. That is, exposure period control is implemented by providing each pixel of the CMOS sensor with one of the two kinds of reset timings. At this time, the pixel output Vout in one row can be derived at once, that is, readout of one row can be done at once. Hence, the readout time per frame can be shortened as compared to the above-described first embodiment. The column transfer transistors are ON/OFF-controlled by one kind of column transfer pulse. It is therefore possible to reduce the load and memory capacity for transistor control.

The FD 1306 is always reset to the drain potential of the reset transistor 1303 before completely transferring charges in the PD 1301 to the FD 1306 independently of whether the exposure is short-period exposure or long-period exposure. Hence, noise generated in the FD 1306 during exposure can be removed.

Third Embodiment

The third embodiment of the present invention will be described next.

In the third embodiment as well, exposure period control is performed by providing each pixel on the lines of an image sensor 102 with two kinds of reset timings, as in the above-described second embodiment, although the column transfer pulse is unnecessary. Note that an image capturing apparatus 1 according to the third embodiment has the same arrangement as in the above-described first embodiment except the arrangement of a pixel 1202 in the image sensor (CMOS sensor) 102.

Pixel Arrangement of Image Sensor 102

Figure 17:
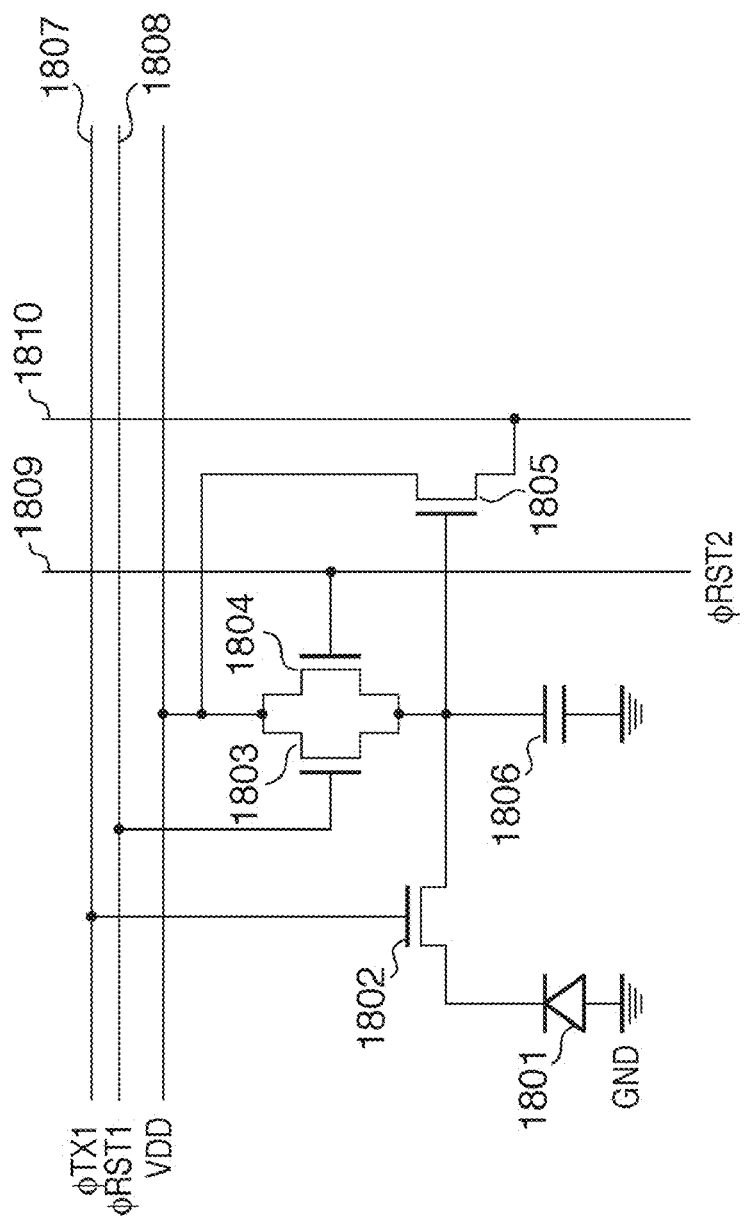
FIG. 17 is a circuit diagram showing an example of the circuit arrangement of an image sensor according to the third embodiment.

FIG. 17 is a circuit diagram showing an example of the circuit arrangement of the pixel 1202 of the image sensor (CMOS sensor) 102 according to the third embodiment. Only operations different from the above-described first embodiment will be explained below, and a description of common parts will be omitted.

Referring to FIG. 17, the pixel 1202 includes a buried PD 1801 and four n-channel MOS transistors (to be simply referred to as transistors hereinafter) 1802 to 1805. The drains of the transistors 1802 and 1804 and the source connection portions of the transistors 1803 and 1804 are formed with an FD (Floating Diffusion) 1806. Row signal lines 1807 and 1808 and column signal lines 1809 and 1810 represent signal lines for the transistors. VDD represents a power supply; and GND, ground. Note that each gate is turned on when a corresponding signal is H (High) and off when the signal is L (Low).

The PD 1801 serves as a photoelectric conversion unit which accumulates charges corresponding to the incident light amount from an object, that is, charges obtained by photoelectrically converting incident light. The accumulated signal charges are output as the row transfer transistor 1802 called a transfer gate completely transfers them to the FD 1806. The transferred signal charges are accumulated in the FD 1806. Note that the potential of the row transfer transistor 1802 is represented by φTX.

The transistor 1803 is called a row reset transistor. The transistor 1803 is turned on to reset the FD 1806 to a predetermined potential (φRSB1). The transistor 1804 is called a column reset transistor. The transistor 1804 is turned on to reset the FD 1806 to a predetermined potential (φRSB2). In these reset operations, noise (reset noise) may be generated, that is, the potential of the FD 1806 may vary from φRSB1 or φRSB2. Note that the potential (row reset pulse) of the row reset transistor 1803 is represented by φRST1. The potential (column reset pulse) of the column reset transistor 1804 is represented by φRST2.

The transistor 1805 forms a source follower amplification circuit. The transistor 1805 has a function of lowering the output impedance by performing current amplification for a potential VFD of the FD 1806. The drain of the transistor 1805 is connected to the column signal line 1810 so that the potential of the FD will be at low impedance and derived to a column selection line 1209 as a pixel output Vout.

As shown in FIG. 17, the pixel 1202 of the third embodiment includes the column reset transistor 1804 in place of the column transfer transistor.

Scheme of Driving CMOS Sensor

In the third embodiment, the exposure period is controlled by providing each pixel with one of two kinds of reset timings by the row transfer transistor 1802 and the row reset transistor 1803 and by the row transfer transistor 1802 and the column reset transistor 1804.

The scheme of driving the pixels 1202 of the CMOS sensor according to the third embodiment and its characteristics will be described below with reference to FIG. 18. FIG. 18 is a timing chart showing a driving method of ON/OFF-controlling the transistor 1802 serving as a transfer gate, the row reset transistor 1803, and the column reset transistor 1804. Referring to FIG. 18, t61 to t618 represent timings.

Referring to FIG. 18, at the timing t61, all the row reset transistors 1803 in the n:th row are turned on. Additionally, the gates of all the row transfer transistors 1802 in the n:th row are turned on. Charges in all the PDs 1801 in the n:th row are thus completely transferred to the FDs 1806 to reset the PDs. All the FDs 1806 in the n:th row are also reset to the drain potential of the row reset transistors 1803. At the timing t62, the gates of all the row reset transistors 1803 in the n:th row are turned off to transfer charges accumulated in all the PDs 1801 in the n:th row to the FDs 1806.

At the timing t63, all the row reset transistors 1803 in the (n+1)th row are turned on. Additionally, the gates of all the row transfer transistors 1802 in the (n+1)th row are turned on. Charges in all the PDs 1801 in the (n+1)th row are thus completely transferred to the FDs 1806 to reset the PDs. All the FDs 1806 in the (n+1)th row are also reset to the drain potential of the row reset transistors 1803. At the timing t64, the gates of all the row reset transistors 1803 in the (n+1)th row are turned off to transfer charges in all the PDs 1801 in the (n+1)th row to the FDs 1806.

At the timing t65, the gates of the reset transistors 1804 in the n:th row, where the transistors are in the columns for short-period exposure, are turned on. In addition, charges in the FDs 1806 in the n:th row, where the FDs are in the columns for short-period exposure, are reset to the drain potential of the row reset transistors 1803. At the timing t66, the reset transistors 1804 in the n:th row, where the transistors are in the columns for short-period exposure, are turned off to transfer charges in the n:th row, where the PDs are in the columns for short-period exposure, to the FDs 1806.

Next, at the timing t67, all the row reset transistors 1803 in the (n+2)th row are turned on. Additionally, the gates of all the row transfer transistors 1802 in the (n+2)th row are turned on. Charges in all the PDs 1801 in the (n+2)th row are thus completely transferred to the FDs 1806 to reset the PDs. All the FDs 1806 in the (n+2)th row are also reset to the drain potential of the row reset transistors 1803. At the timing t68, the gates of all the row reset transistors 1803 in the (n+2)th row are turned off, thereby transferring charges in all the PDs 1801 in the (n+2)th row to the FDs 1806.

At the timing t69, the gates of all the row transfer transistors 1802 in the n:th row are turned off. In addition, the transistors 1805 in the n:th row are turned on. The potential of the FDs 1806 is thus at low impedance and derived to the output circuit 1205 as a pixel output Voutn of the n:th row. Additionally, the gates of the reset transistors 1804 in the (n+1)th row, where the transistors are in the columns for short-period exposure, are turned on. Charges in the FDs 1806 in the (n+1)th row, where the FDs are in the columns for short-period exposure, are reset to the drain potential of the reset transistors 1803.

At the timing t610, the column reset transistors 1804 in the (n+1)th row, where the transistors are in the columns for short-period exposure, are turned off to transfer charges in the (n+1)th row, where the PDs are in the columns for short-period exposure, to the FDs 1806. At the timing t611, deriving of the pixel output Voutn to the output circuit 1205 ends.

At the timing t612, the gates of all the row transfer transistors 1802 in the (n+1)th row are turned off. In addition, the transistors 1805 in the (n+1)th row are turned on. The potential of the FDs 1806 is thus derived to the output circuit 1205 as a pixel output Voutn+1 of the (n+1)th row at low impedance. Additionally, the gates of the reset transistors 1804 in the (n+2)th row, where the transistors are in the columns for short-period exposure, are turned on. Charges in the FDs 1806 in the (n+2)th row, where the FDs are in the columns for short-period exposure, are reset to the drain potential of the row reset transistors 1803.

At the timing t613, the column reset transistors 1804 in the (n+2)th row, where the transistors are in the columns for short-period exposure, are turned off to transfer charges in the (n+2)th row, where the PDs are in the columns for short-period exposure, to the FDs 1806. At the timing t614, deriving of the pixel output Voutn+1 to the output circuit 1205 ends.

At the timing t615, the gates of all the row transfer transistors 1802 in the (n+2)th row are turned off. In addition, the transistors 1805 in the (n+2)th row are turned on. The potential of the FDs 1806 is thus at low impedance and derived to the output circuit 1205 as a pixel output Voutn+2 of the (n+2)th row. At the timing t616, deriving of the pixel output Voutn+2 to the output circuit 1205 ends.

As described above, according to the third embodiment, two kinds of reset timings by the row transfer transistor 1802 and the row reset transistor 1803 and by the row transfer transistor 1802 and the column reset transistor 1804 are used. That is, exposure period control is implemented by providing each pixel of the CMOS sensor with one of the two kinds of reset timings. At this time, the pixel output Vout in one row can be derived at once, that is, readout of one row can be done at once. Hence, the readout time per frame can be shortened as compared to the above-described first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-144639, filed Jun. 17, 2009, which is hereby incorporated by reference herein in its entirety.

What is claimed is:

1. An image capturing apparatus comprising:
an image capturing unit configured to capture an image by driving a plurality of image sensor pixels;
a generation unit configured to generate an exposure period map by assigning, to each of the plurality of image sensor pixels, exposure control information to control a charge accumulation time, based on preliminary captured image data obtained by preliminary image capturing using said image capturing unit, the exposure control information including first exposure control information corresponding to a first accumulation time and second exposure control information corresponding to an accumulation time longer than the first exposure control information;
a correction unit configured to expand a first region having the first exposure control information on the exposure period map; and
a control unit configured to control the accumulation time for each of the plurality of image sensor pixels in accordance with the exposure period map corrected by said correction unit,
wherein said image capturing unit performs main capturing in accordance with the accumulation time controlled by said control unit.

2. The apparatus according to claim 1, wherein said image capturing unit is configured to perform the preliminary image capturing with uniform accumulation time for each pixel of the image sensor.

3. The apparatus according to claim 1, further comprising a boundary luminance configuration unit configured to set a boundary luminance representing a boundary of the first region,
wherein said generation unit is configured to assign one of the first exposure control information and the second exposure control information to each pixel of the image sensor by binarizing a luminance of each pixel in the preliminary captured image data using the boundary luminance as a threshold.

4. The apparatus according to claim 1, further comprising a gain correction unit configured to perform gain correction for main capturing data obtained by the main capturing based on the accumulation time.

5. The apparatus according to claim 1, wherein said image capturing unit is configured to perform additional preliminary image capturing with another capturing condition when the preliminary capturing data includes a pixel having a luminance more than a predetermined value.

6. The apparatus according to claim 1, wherein the image sensor is a CMOS sensor.

7. The apparatus according to claim 6, wherein said image capturing unit is configured to generate a reset pulse, a row transfer pulse, and a column transfer pulse as driving pulses for each pixel of the image sensor, and provide each pixel in one row within the image sensor with column transfer timings using the column transfer pulse, when performing the main capturing, wherein the column transfer timings correspond to one of the first exposure control information and the second exposure control information.

8. The apparatus according to claim 6, wherein said image capturing unit is configured to generate a reset pulse, a row transfer pulse, and a column transfer pulse as driving pulses for each pixel of the image sensor, and provides each pixel in one row within the image sensor with a reset timing corresponding to the second exposure control information using the reset pulse and the row transfer pulse, and a reset timing corresponding to the first exposure control information using the reset pulse and the column transfer pulse, when performing the main capturing.

9. The apparatus according to claim 6, wherein said image capturing unit is configured to generate a row reset pulse, a column reset pulse, and a row transfer pulse as driving pulses for each pixel of the image sensor, and provides each pixel in one row within the image sensor with a reset timing corresponding to the second exposure control information using the row reset pulse and the row transfer pulse, and a reset timing corresponding to the first exposure control information using the column reset pulse and the row transfer pulse, when performing the main capturing.

10. A method of capturing an image performed by an image capturing apparatus, comprising:

a preliminary image capturing step of capturing an image by driving a plurality of image sensor pixels;

a generation step of generating an exposure period map by assigning, to each of the plurality of image sensor pixels, exposure control information to control a charge accumulation time, based on preliminary captured image data obtained by preliminary image capturing in said preliminary image capturing step, the exposure control information including first exposure control information corresponding to a first accumulation time and second exposure control information corresponding to an accumulation time longer than the first exposure control information;

a correction step of expanding a first region having the first exposure control information on the exposure period map;

a control step of controlling the accumulation time for each of the plurality of image sensor pixels in accordance with the exposure period map corrected in the correction step; and a main capturing step of capturing an image in accordance with the accumulation time controlled in the control step.

11. A non-transitory computer-readable storage medium storing a program which controls a computer apparatus and causes the computer apparatus to function as each unit of an image capturing apparatus of claim 1.

* * * * *